(12) United States Patent  (10) Patent No.: US 8,417,482 B2
Bohan et al.  (45) Date of Patent: *Apr. 9, 2013

(54) SELF CONTAINED BOILER SENSOR

(75) Inventors: John Bohan, Avon Lake, OH (US);
Christopher Fildes, Elyria, OH (US);
Tim Beight, Amherst, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/834,451

(22) Filed: Jul. 12, 2010

(65) Prior Publication Data

US 2012/0010845 A1 Jan. 12, 2012

(51) Int. Cl.
*G01K 1/00* (2006.01)
*G06F 11/30* (2006.01)

(52) U.S. Cl.
USPC ................................ 702/182; 702/130

(58) Field of Classification Search .............. 702/33, 702/45, 47, 50, 62, 130, 132, 136, 138, 182, 702/185, 189; 165/48.1; 236/46 C, 51, 91 F; 237/2 B, 8 A, 8 R, 46; 700/275, 276, 291, 700/300

See application file for complete search history.

(56) References Cited

U.S. PATENT DOCUMENTS

| | | |
|---|---|---|
| 5,042,431 A | 8/1991 | Shprecher et al. |
| 5,190,215 A | 3/1993 | Habermehl, Jr. et al. |
| 5,216,623 A | 6/1993 | Barrett et al. |
| 5,775,582 A | 7/1998 | Hammer |
| 5,829,475 A | 11/1998 | Acker |
| 5,855,320 A | 1/1999 | Grinbergs |
| 5,861,558 A | 1/1999 | Buhl et al. |
| 5,984,198 A | 11/1999 | Bennett et al. |
| 6,032,868 A | 3/2000 | DiMarco |
| 6,109,339 A | 8/2000 | Talbert et al. |
| 6,536,678 B2 | 3/2003 | Pouchak |
| 7,240,851 B2 | 7/2007 | Walsh, Jr. |
| 7,356,548 B1 | 4/2008 | Culp et al. |
| 7,415,884 B1 | 8/2008 | Shaw et al. |
| 7,460,933 B2 | 12/2008 | Chapman et al. |
| 7,831,340 B2 | 11/2010 | Fusi |
| 7,962,536 B2 | 6/2011 | Culp et al. |
| 7,966,099 B2 | 6/2011 | Fima |
| 7,970,494 B2 | 6/2011 | Fima |
| 2003/0200011 A1 | 10/2003 | Grauer |
| 2005/0258260 A1 | 11/2005 | Ahmed |
| 2005/0268628 A1 | 12/2005 | Thompson |

(Continued)

OTHER PUBLICATIONS

Final Office Action dated Apr. 9, 2012 for U.S. Appl. No. 12/435,264.

(Continued)

*Primary Examiner* — John H Le
(74) *Attorney, Agent, or Firm* — Eschweiler & Associates, LLC

(57) ABSTRACT

A system and method is presented for a multi-sensor component for an HVAC system. The multi-sensor component includes a sensor assembly, having one or more detectors, including a plurality of temperature detectors operable to measure a temperature of an object or a medium, a presence detector operable to detect the presence of the object or medium, and a pressure detector operable to measure a pressure of the medium. The multi-sensor component also includes a sensor monitor operably coupled to the detectors of the sensor assembly and configured to use a detection algorithm operable to detect one or more of the temperature, pressure and presence of the object or medium, the sensor monitor configured to verify a health of the one or more detectors of the sensor assembly, and also includes a sensor housing or thermo-well or combination thereof having the sensor assembly and the sensor monitor affixed therein.

16 Claims, 23 Drawing Sheets

U.S. PATENT DOCUMENTS

| | | |
|---|---|---|
| 2006/0272830 A1 | 12/2006 | Fima |
| 2007/0000908 A1 | 1/2007 | Bohan, Jr. et al. |
| 2007/0085678 A1 | 4/2007 | Joy et al. |
| 2007/0191994 A1 | 8/2007 | Patterson et al. |
| 2007/0205292 A1 | 9/2007 | Kwak |
| 2009/0057425 A1 | 3/2009 | Sullivan et al. |
| 2009/0090789 A1 | 4/2009 | Zirkiyev et al. |
| 2009/0204263 A1 | 8/2009 | Love |
| 2010/0012291 A1 | 1/2010 | Sporie |

OTHER PUBLICATIONS

Non-Final Office Action Dated Oct. 11, 2011 for U.S. Appl. No. 12/435,238.
Non-Final Office Action from U.S. Appl. No. 12/435,008. 29 Pages.
Non-Final Office Action dated Jul. 5, 2012 to U.S. Appl. No. 12/435,149.
Non-Final Office Action dated Jul. 6, 2012 to U.S. Appl. No. 12/435,008.
Non-Final Office Action Dated Aug. 25, 2011 for U.S. Appl. No. 12/435,149. 30 Pages.
Non-Final Office Action Dated Sep. 2, 2011 for U.S. Appl. No. 12/435,264. 1-22 pgs.
U.S. Appl. No. 12/435,008, filed with the USPTO on May 4, 2009.
U.S. Appl. No. 12/435,149, filed with the USPTO on May 4, 2009.
U.S. Appl. No. 12/435,238, filed with the USPTO on May 4, 2009.
U.S. Appl. No. 12/435,264, filed with the USPTO on May 4, 2009.

SELF CONTAINED BOILER SENSOR

FIELD OF INVENTION

The present invention relates generally to sensors and more particularly to multiple sensor components, systems, methods and detection algorithms that operate in a fail-safe manner to detect the temperature, pressure and presence of an object or medium within a heating, ventilating, or air-conditioning (HVAC) system, and are integrated together within a single sensor housing.

BACKGROUND OF THE INVENTION

Heating systems employ various methods to control the temperature and other such variables of components within the system. The temperatures of these components are usually regulated within a particular range in order to maintain safe operation. Two such components that require regulation are heat exchangers of furnaces and the water inside a pressurized hot water boiler. In such safety-related components, redundant sensors may be used in order to provide greater confidence that the individual sensors are operating properly. Two or more such sensors may reduce the probability that the heating control system is reading an incorrect temperature, however, the proper functionality of the additional sensors are still not known with any greater confidence than the original sensor.

Temperature measurement is important in many such processes. A common method of temperature measurement uses thermocouple transducers that output an EMF in response to a temperature gradient across two dissimilar materials, typically metals. It is well known, however, that thermocouples degrade over time due to chemical and metallurgical changes in the composition of the materials. Various thermal sensors and detectors such as thermistors, platinum resistance elements, and other types of temperature sensors are also utilized in many heating, ventilation, and air-conditioning (HVAC) applications.

Most temperature sensors used in these HVAC applications, whether used in industrial, commercial, or residential markets, eventually suffer from some form of serious degradation and/or failure of the sensor. Such degradation or failure modes of temperature detectors, for example, include thermal degradation, metal fatigue, and corrosion, chemical and mechanical changes, which may render the sensor inoperable or induce a system failure.

During the use of thermocouples, for example, several forms of degradation take place in the thermocouple circuit including chemical, metallurgical, and mechanical changes in the materials and elements or devices of the circuit. Such changes may be accompanied by a shift in the resistivity of the thermoelement, thereby indicating a false temperature measurement.

Heating applications likely produce the greatest potential for sensor failures, because the sensor is particularly susceptible to extremes of thermal degradation and chemical changes. These sensors may include temperature, pressure, flow, and medium presence sensors, and others such as may be used in furnaces and boilers. The exposed portion of the sensor is often the hottest portion of the measurement circuit and may therefore be exposed to the harshest conditions. These HVAC sensors may also be exposed to processes that increase the likelihood of changes in the electrical properties of the sensor or cause a complete system failure.

In boiler applications, for example, temperature, pressure, flow, and medium presence detection may be used, wherein the failure of a temperature sensor or an associated low water level cutoff detector may cause a boiler malfunction or failure. Thus, the failure of such boiler sensors poses a problem. In furnace applications, the temperature sensors and/or limit detectors used in a heat exchanger of a furnace may also reach very high temperatures, and cause overheating conditions that could cause the system to fail. Accordingly, a fail-safe temperature sensor, and/or a fail-safe low water level cut-off detector and/or a pressure sensor would be desirable to avoid such problems.

For design, manufacturing, and applications reasons, the HVAC sensors discussed above are generally individually fabricated, packaged and mounted. However, the use of these numerous individual sensors also requires more system mounting difficulties, additional wiring and added complexity in support of the remaining portion of the control system. Such additional support components and circuitry may include related relays, power supplies, and microprocessors that increase the overall cost and complexity of the system.

In many applications, however, several specific sensors are commonly used as a set. For example, in the case of boiler heating systems, a boiler water temperature sensor is usually accompanied by a low water cutoff detector, which senses the presence of the water (or another such medium) when strategically placed at the low water level of the boiler. If the water falls below this level, the system is typically shut-down until more water is added, thereby immersing the sensor again. In addition, pressure sensors and/or pressure relief valves are usually included in boiler systems to monitor and/or relieve over-pressure conditions such as in the event the boiler overheats producing steam and an excessive pressure build-up. A pressure sensor is useful to monitor for such failsafe conditions, particularly if the water falls below the low water level.

Accordingly, for fail-safe readings and operations, improved signal to noise ratio, reduced size and cost, mounting and system simplicity reasons, there is a need for a fail-safe sensor of a monitoring system that incorporates multiple temperature and/or one or more other process variables such as pressure and medium presence detection functions together with the associated signal processing circuits within a single sensor housing, thermal well or a combination thereof.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a multi-sensor component for an HVAC system operable to perform in a fail-safe manner. The multi-sensor component comprises a sensor assembly, having one or more detectors, comprising a plurality of temperature detectors operable to measure a temperature of an object or a medium, a presence detector operable to detect the presence of the object or medium in contact with the multi-sensor component, and a pressure detector operable to measure a pressure of the medium against the multi-sensor component. The multi-sensor component also includes a sensor monitor operably coupled to the detectors of the sensor assembly, the sensor monitor configured to use a detection algorithm operable to detect one or more of the temperature, pressure and presence of the object or medium in contact with the multi-sensor component, the sensor monitor configured to verify a health of the one or more detectors of the sensor assembly. The multi-sensor component further includes a sensor housing, thermo-well, or a combination thereof having the sensor assembly and the sensor monitor affixed therein.

In another embodiment, the plurality of temperature detectors individually comprise a temperature sensor and a respective heater affixed together on a substrate and having substantially close thermal union with one another, wherein each heater comprises one or more resistive elements, and wherein the plurality of temperature detectors reside on the same substrate affixed within the same sensor housing, thermo-well or a combination thereof of the multi-sensor component.

In yet another embodiment, the sensor monitor is configured to verify the health of the plurality of temperature detectors of the sensor assembly, comprising periodically selecting one of the plurality of temperature detectors for the health verification, the selected temperature detector comprising a temperature sensor and a respective heater affixed together on a substrate and having substantially close thermal union with one another, and heating the selected temperature detector with a predetermined energy using the respective heater, or heating the selected temperature detector for a predetermined period of time using the respective heater. The health is further verified by determining if the selected temperature detector has increased in temperature as measured by the temperature sensor to exceed one of an allowable temperature change, rate of change, and time constant of a thermal rise rate of the selected temperature detector, the determination thereof corresponding to a health verification of the selected temperature detector, and encoding the health verification into a formatted sensor signal, based on the health verification determination.

In still another aspect, the presence detector comprises a heater operable to heat the multi-sensor component to an expected temperature as measured by the temperature detector or to heat the multi-sensor component with a predetermined energy, and wherein in a heating mode the multi-sensor component is either heated by the heater to the expected temperature or is heated with the predetermined energy, and wherein in a cooling mode the multi-sensor component cools toward a temperature associated with the object or medium, and the temperature detector provides temperature data indicative of a temperature response comprising one of a temperature change, a rate of change, and a time constant of a thermal decay rate of the multi-sensor component and the presence of the object or medium.

In another embodiment of the present invention, a multi-sensor component for detecting water temperature and the presence of water in a boiler, comprising a temperature detector comprising a temperature sensor and a heater affixed together within a single sensor housing of the multi-sensor component, wherein the heater comprises one or more resistive elements, and is configured for substantially close thermal communication with the temperature sensor. The multi-sensor component also includes a sensor monitor operably coupled to the temperature detector, the sensor monitor configured to detect the temperature of the water in the boiler using the temperature detector, the sensor monitor configured to verify a health of the temperature detector using a health diagnostic routine, and the sensor housing comprising the temperature detector and the sensor monitor affixed therein.

In still another embodiment, the multi-sensor component further comprises a plurality of temperature detectors individually comprising a temperature detector and a heater affixed together within the single sensor housing of the multi-sensor component, wherein each heater comprises one or more resistive elements, and has substantially close thermal communication with a respective temperature detector of the plurality of temperature detectors.

In one aspect of the present invention, a method is disclosed for verifying the health of a temperature detector within a multi-sensor component used in an HVAC system comprising a plurality of temperature detectors individually operable to detect a temperature of an object or a medium against the multi-sensor component; a sensor monitor operably coupled to the temperature detector and configured to measure the detected temperature of the object or medium in the HVAC system, the sensor monitor configured to verify a health of one or more of the temperature detectors; and the sensor housing comprising the plurality of temperature detectors and the sensor monitor affixed therein. The method comprising periodically selecting one of the plurality of temperature detectors for the health verification, the selected temperature detector comprising a temperature sensor and a respective heater affixed together on a substrate and having substantially close thermal union with one another, and heating the selected temperature detector with a predetermined energy using the respective heater, or heating the selected temperature detector for a predetermined period of time using the respective heater. The method further includes determining if the selected temperature detector has increased in temperature as measured by the temperature sensor to exceed one of an allowable temperature change, rate of change, and time constant of a thermal rise rate of the selected temperature detector, the determination thereof corresponding to a health verification of the selected temperature detector. Finally, the method includes encoding the health verification into a formatted sensor signal, based on the health verification determination.

In another embodiment, the method further comprises generating a temperature detector alarm if the health verification determination is that the health of the selected temperature detector is not okay, and measuring a temperature of the object or medium using the temperature detector if the health verification determination is that the health of the selected temperature detector is okay.

The method also includes averaging together two or more temperature measurements generated by the plurality of temperature detectors into an average temperature signal and encoding the average temperature signal into the formatted sensor signal, in order to provide temperature measurement redundancy, and outputting the average temperature signal from the multi-sensor component to an HVAC controller.

Thus, by incorporating into one sensor housing multiple sensors, the multi-sensor component of the present invention eliminates the need for separate and relatively costly temperature, pressure and medium presence detection (e.g., low water cutoff) devices and controls (e.g., related relays, power supplies, and microprocessors) currently used in conventional HVAC systems, and by further including sensor monitoring and/or clamping circuits onto a single substrate prior to measurement communication with an HVAC controller, the signal to noise ratio therebetween may be improved along with cost and size reductions.

In another implementation of the present invention, the multi-sensor component may be used to measure the temperature of a heat exchanger, an outlet plenum, an air stream, a chamber wall, a stack, or other component, for example, in a furnace or another HVAC system. In such a case, the temperature response may be used to indicate whether the sensor has adequate thermal contact with the furnace component or has become loose or separated from the furnace component.

In yet another aspect of the invention, the HVAC system may be, for example, one or a combination of a furnace, a boiler, a ventilation system, a refrigeration system, or an air-conditioning system.

Detecting the temperature or presence of other solids or liquids surrounding the sensor is also contemplated in the context of the systems and methods of the present invention.

A sensor monitor of the present invention monitors or measures the resistance associated with a temperature of a temperature detector comprising a temperature sensor and a heater affixed together in substantially close thermal communication within a single sensor housing of the multi-sensor component. The sensor monitor is also configured to verify a health of the temperature detector using a health diagnostic routine, thereby providing a determination of the health of the sensor.

The health diagnostic routine comprises, for example, periodically selecting the temperature detector for the health verification of the temperature detector, and heating the selected temperature detector with a predetermined energy using the heater, or heating the selected temperature detector for a predetermined period of time using the heater. The health diagnostic routine, for example, also includes determining if the selected temperature detector has increased in temperature as measured by the temperature sensor to exceed one of an allowable temperature change, rate of change, and time constant of a thermal rise rate of the selected temperature detector, the determination thereof corresponding to the health verification of the selected temperature detector, and encoding the health verification into a formatted sensor signal, based on the health verification determination.

The present invention further provides an algorithm for HVAC systems to identify a temperature, a low medium alarm, and a failed sensor alarm in a sensor measurement circuit. For example, the algorithm, according to one aspect of the invention, utilizes one or more values supplied by the manufacturer of the sensor and one or more expected temperature response (e.g., time constant TC) levels for comparison to the calculated temperature response levels, whereby the presence (or absence) of the medium is determined based on the comparison results.

For example, a first expected (cool-down) temperature response level is initially input into the analyzer for use by the algorithm corresponding to a medium (e.g., water) present at a low water level cut-off location of the multi-sensor component. If a determination is made upon comparison that the computed temperature response level has exceeded the first expected temperature response level, the medium is present at the multi-sensor component, however, if the first expected temperature response level is not exceeded, the medium is absent from the multi-sensor component, and a low water cut-off alarm is generated. If the computed temperature response has not exceeded a second expected (cool-down) temperature response level, or if a third predetermined (warm-up) temperature response level is not exceeded, a sensor maintenance alarm may be generated.

Thus, by applying parameters specific to the temperature detector, pressure detector and heater of a sensor used in a monitoring system, added accuracy is obtained in determining, for example, the temperature response level for the applicable medium used in the HVAC system using the algorithms of the present invention. Further, it is anticipated that the algorithms used in the methods and temperature monitoring system of the present invention may be used to identify degradation of the sensor in order to predict a future potential sensor system failure therein.

The temperature monitoring system of the present invention may comprise a temperature and pressure sensor, a storage component, and a controller or analyzer comprising an algorithm for identifying a temperature, a pressure, a low medium alarm, a sensor alarm, and optionally for predicting certain types of impending failures of the temperature sensor or the HVAC system. The controller/analyzer of the monitoring system is operable to receive sensor parametric input values available from the sensor, monitor a plurality of two or more sensor (e.g., RTD, thermistor, thermocouple) inputs, monitor the temperature detector resistance of the sensor, supply or remove a voltage (e.g., from a power supply) to the heater of the sensor for heating or cooling the sensor, and calculate and store the parameters and expected TC levels in the storage component. In response, the controller/analyzer may then provide one or more of a temperature detection, a pressure detection, a low medium alarm, a sensor alarm, and a failure prediction based on an analysis of the multi-sensor component (e.g., resistance) measurement results from the algorithm.

For example, the detection system may, according to one aspect of the invention, monitor the resistance of a detector for changes that are analyzed and determined to be due to a level of sensor degradation greater than a predetermined acceptable level. Although only the detector resistance need be monitored, an accurate determination may be made using the algorithm and several parameters of the temperature detector from the manufacturer.

In accordance with another aspect of the invention, by creating a time-series history of periodic multi-sensor component TC level calculations, a prediction of an imminent multi-sensor component or HVAC system failure, or a prediction of a next expected value may be provided by the monitoring system.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
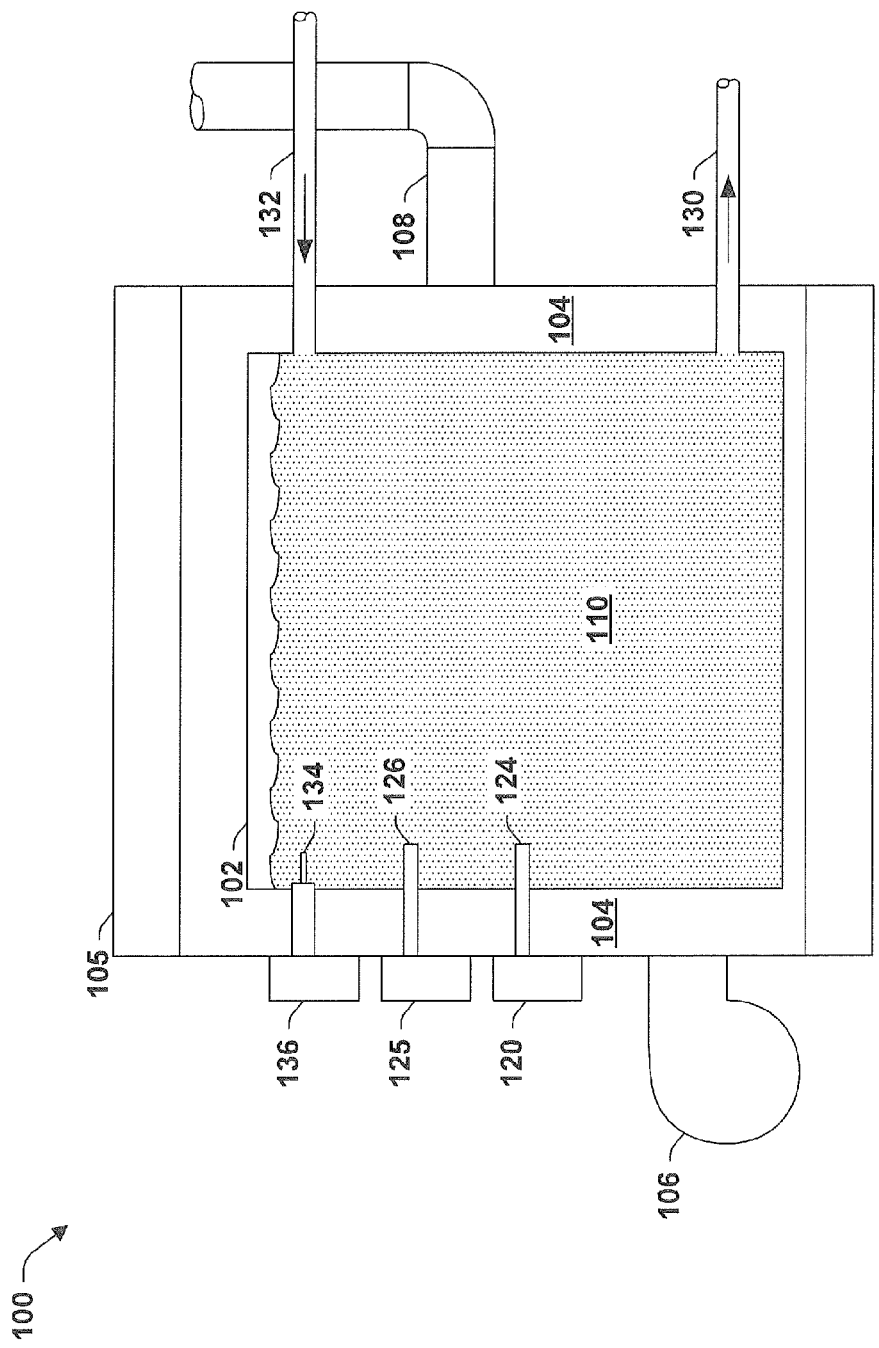
FIG. 1 is a simplified diagram of a prior art hot water boiler system using a separate conventional temperature sensor for measuring the temperature of the water, a pressure detector and a low water cut-off detector used to detect the presence of water in the boiler.

The present invention will now be described with reference to the attached drawings, wherein like reference numerals are used to refer to like elements throughout. The invention relates to a fail-safe multi-sensor component configured to detect, measure, and signal process a temperature, pressure and the presence of an object or a medium within a heating, ventilating, and air-conditioning (HVAC) system or another such system in a fail-safe manner, and a method for verifying the health of the one or more detectors within the multi-sensor component.

The fail-safe multi-sensor component (or sensor) of the present invention incorporates the functions of a sensor assembly and a sensor monitor within a single sensor housing or thermo-well or combination thereof. In one aspect of the invention, the sensor assembly (or multi-sensor assembly) of the present invention comprises a plurality of temperature detectors comprising a temperature sensor and a heater such as a resistive heating element that is operable to heat the temperature detector of the multi-sensor component as directed by a sensor monitor. The sensor monitor also periodically controls the heating of a selected temperature detector to a predetermined temperature or with a predetermined energy as measured by the temperature detector, for example, to verify the health of the selected detector of the sensor assembly.

In one implementation, the sensor assembly or multi-sensor assembly, comprises one or more detectors, comprising a plurality of temperature detectors operable to measure a temperature of an object or a medium, a presence detector operable to detect the presence of the object or medium in contact with the multi-sensor component, and a pressure detector operable to measure a pressure of the medium against the multi-sensor component.

In another implementation, the multi-sensor component also includes a sensor monitor operably coupled to the one or more detectors of the sensor assembly, the sensor monitor configured to use a detection and health algorithm operable to detect one or more of the temperature, pressure and presence of the object or medium in contact with the multi-sensor component, the sensor monitor configured to verify a health of the one or more detectors of the sensor assembly. The multi-sensor component further includes a sensor housing, thermo-well, or combination thereof having the sensor assembly and the sensor monitor affixed therein. The sensor monitor is also configured and operable to receive one or more sensor parametric inputs (e.g., a sensor model, a sensor serial number, a manufacturing date, a calibration temperature and a calibration pressure) provided by the manufacturer or by other means, may be used in the detection and health algorithm of the multi-sensor component or in the HVAC controller (e.g., a Beckett AquaSmart controller).

In one implementation of the sensor monitor of the multi-sensor component, two or more temperature signals generated by the plurality of temperature detectors are averaged together by the detection and health algorithm into an average temperature signal before being formatted into a formatted sensor signal, in order to provide temperature measurement redundancy. In one embodiment, the sensor monitor further includes a signal processor that encodes the average temperature signal (together with any other pressure or presence signals) into the formatted sensor signal, and then outputs the formatted sensor signal from the signal processor to an HVAC controller, for example, over an input/output (I/O) bus also included within the sensor housing of the multi-sensor component.

In another embodiment, the multi-sensor component also includes a clamping circuit within the sensor housing and coupled to the signal processor of the sensor monitor, the clamping circuit used to mitigate noise, over-voltages and under-voltages on the I/O bus. In addition, the signal-to-noise ratio of the information transmitted from the multi-sensor component can be significantly improved by incorporating into one conductive sensor housing (or thermo-well): the multiple sensors, the sensor monitor and the signal processor. For example, the sensor output signal may be encoded into a digital format to improve the signal-to-noise ratio. Further, the surrounding sensor housing provides improved environmental protection of the signal processing therein, and a near hermetic seal for the multi-sensor component.

When used in a hot water boiler application, a goal of the fail-safe multi-sensor component of the present invention is to combine the functions of a temperature detector and a low water cut-off device, and a pressure detector or over-pressure detector within a single sensor. Conventionally, these functions typically require the use of separate devices, which add system complexity as well as cost for the added supporting components (e.g., relays, power supplies, microprocessors, housings, wiring) and for the individual device mounting costs.

Fail-safe operation is obtained in several ways in the present system and method, for example, by using redundant temperature detectors, and by providing the sensor (or multi-sensor component) the ability to verify the health of the temperature detectors or to otherwise confirm that the temperature detectors are working properly. To confirm that one or more of the temperature detectors is working properly, in one aspect of the present invention, an algorithm is provided which is used to detect an object or medium in contact with the sensor and to monitor the health of the sensor. When heated to the expected regulating temperature, the temperature signal of the temperature detector is compared with a known regulated temperature of the heater, using a measured heater current or power input to confirm whether the sensor is presenting an accurate temperature signal to an analyzer or controller. The analyzer or controller may also be included in the multi-sensor component to monitor and/or compare the detector temperature signals from the one or more temperature detectors and supply a measured heating current/power to the heater(s). Alternately, the heater may also serve as a back-up temperature detector when the heater element is not being heated.

The analyzer/controller may also be used to provide a conditioned output of the temperature, pressure and presence signals onto a 2-8 wire bus, for example. The multi-sensor component is then allowed to cool back down to the temperature of the surrounding medium within the system or component it is designed to sense. This method may be thought of as an active sensing method. In this way, the temperature of the system or component may be then measured with greater confidence than that which may be provided with a single sensing device or multiple individual sensing devices.

Thus, the multi-sensor component of the present invention combines temperature, pressure and presence detection having failsafe operations within a single sensor housing, such as brass, stainless steel or Noryl in such a way as to eliminate a thermo-well and the problems associated with thermo-wells.

Initial parameters (parametric inputs) or calibration data of the specific thermoelements used in the sensor may be supplied by the manufacturer or otherwise ascertained and used in the algorithm of the multi-sensor component or in the HVAC controller (e.g., a Beckett AquaSmart™ controller). These parameters may be useful for increasing the accuracy of the temperature measurements, for calibration purposes, or for establishing various setpoints of the detectors. In addition, inputting one or more predetermined acceptable or expected levels of temperature response such as a temperature change, a rate of change and a thermal decay rate time constant may be useful for identification of specific medium densities, for identification of sensor degradation levels and failure predictions, or to limit the range of set points to match appliance limitations.

In order to better appreciate one or more features of the invention, several exemplary implementations of the temperature, pressure and presence detection system, the temperature, pressure and presence detection method, and several types of system outputs is hereinafter illustrated and described in association with the following figures.

FIG. 1 illustrates a prior art hot water boiler system 100, wherein a conventional temperature sensing control device is used for measuring and controlling the boiler based on using separate water temperature and pressure sensors, and a separate conventional low water cut-off detector used to detect the presence of water in the boiler for safe operation thereof. Numerous types of common temperature and pressure sensing devices or sensors are utilized in such HVAC systems, including those based on thermocouples, thermistors, and fluid filled copper bulbs to help regulate the temperature and level of water within the boiler.

The conventional boiler 100 of FIG. 1, comprises a boiler tank 102 surrounded by an insulating material layer 104 within a boiler enclosure 105. A burner 106 having a flue vent 108, heats water 110 (or a water/glycol mix) within the tank 102 to a temperature set by a temperature sensing control device 120. The temperature sensing control device 120 has, for example, a fluid filled copper bulb 124, which expands when heated to actuate a high/low limit module for control of the system about a temperature set point. The heated water 110 is circulated through a feed water line 130 to an external heat exchanger (not shown) and the cooled water returns to the boiler through a supply/return line 132. If the level of the water 110 within the boiler tank 102 drops below the level of a live probe 134 of a low water cut-off device 136, the burner 106 is shut-down until further water 110 is added to the boiler 100 to maintain safe operation by avoiding boiler damage.

In addition, the boiler 100 may further comprise a water pressure sensor 125 utilizing a pressure sensing bulb or diaphragm 126 operable to sense the pressure of the water 110 within the tank 102. The pressure sensor 125, for example, may then use the detected pressure, to safely control a shutdown of the boiler in the event of an over-pressure condition, and to avoid dumping water through a pressure relief valve into the boiler room.

Figure 2:
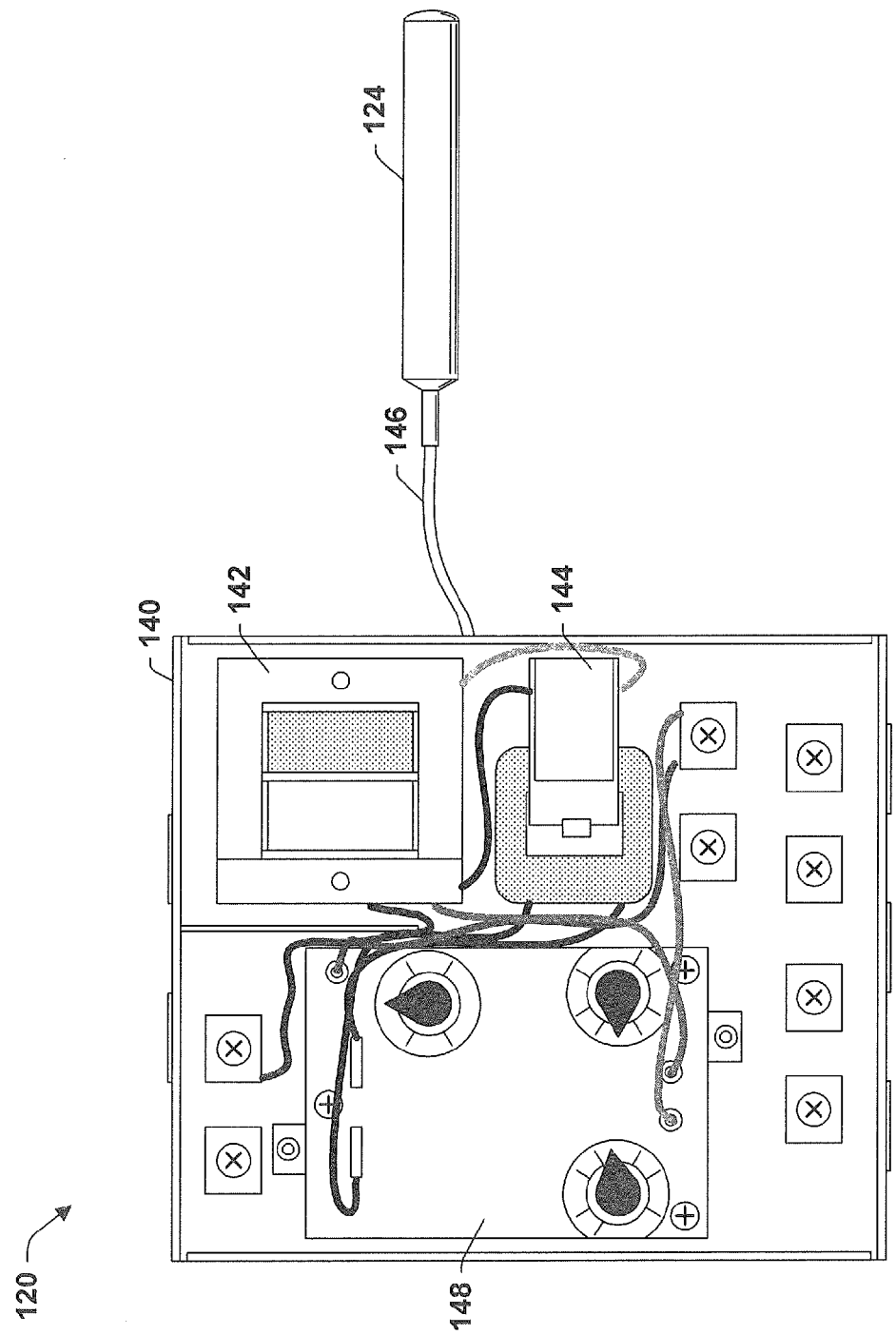
FIG. 2 is a prior art diagram illustrating a conventional temperature sensing control device such as may be used in the prior art boiler system of FIG. 1.

FIG. 2 illustrates a prior art temperature sensing control device 120 such as may be used in the prior art boiler system 100 of FIG. 1. The temperature sensing control device 120 comprises a control housing 140 containing a transformer 142 that supplies power to a room thermostat (not shown), which closes to energize a relay 144. The fluid filled copper bulb 124 is inserted into a well or opening within the boiler tank 102. When the boiler temperature increases, for example, the liquid expands thru copper tubing 146, pushing against a diaphragm that actuates (opens/closes) contacts within a high/low limit module 148. If the thermostat calls for heat (contacts closed), the relay 144 turns the burner 106 on, if the boiler 100 water temperature is not overheated. Relay 144 also turns on a water circulator (not shown) if the water is warm enough. The limit module 148 will also turn on the burner 106 if the boiler temperature gets too cold. Such temperature sensing control devices 120 may include an electronic sensor, a processor, and relays in place of the liquid filled bulb 124 type temperature sensor.

Figures 3A, 3B:
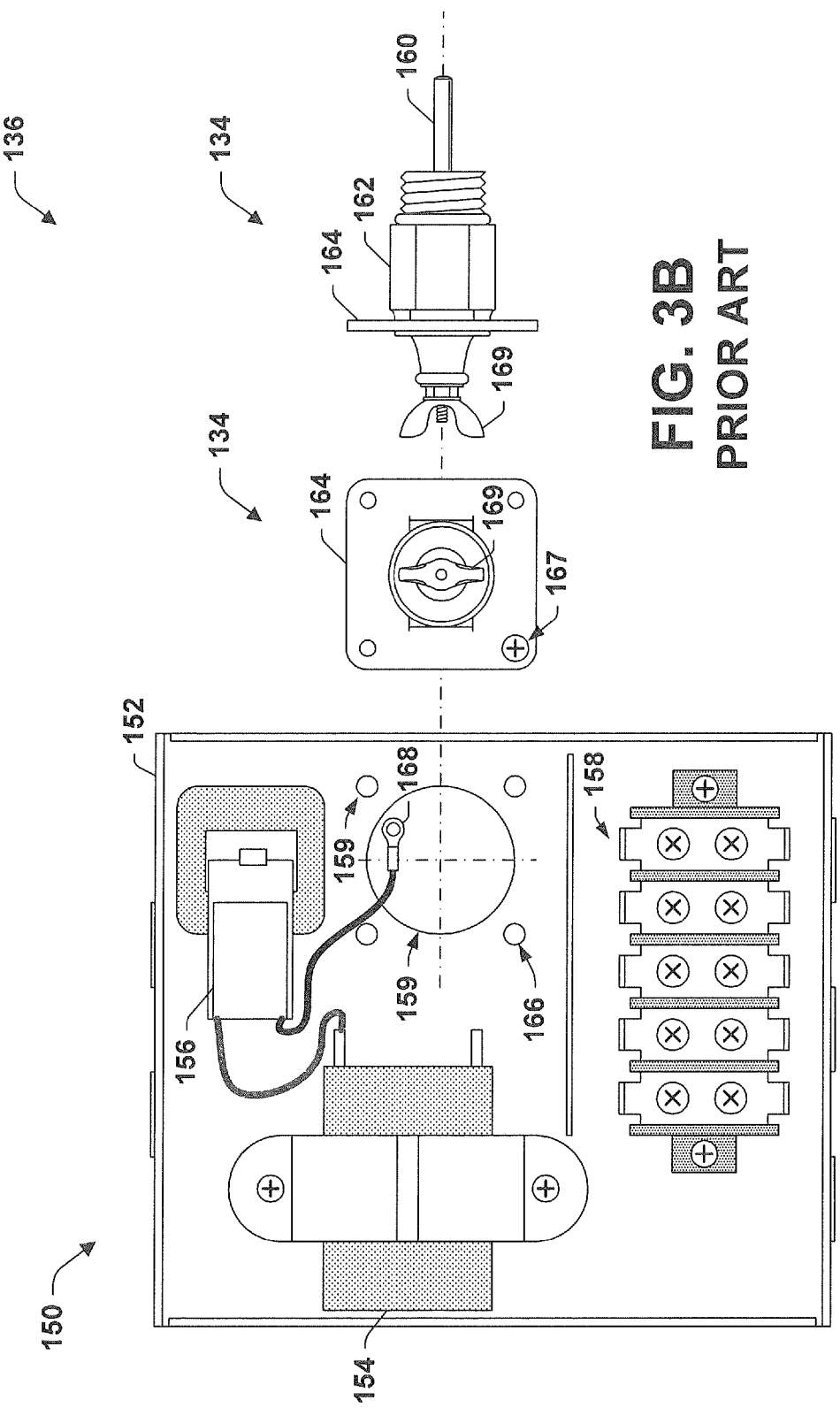
FIGS. 3A and 3B are prior art diagrams illustrating a conventional low water cut-off device having a controller and sensor, respectively, such as may be used in the prior art hot water boiler system of FIG. 1.

FIGS. 3A and 3B illustrate an exemplary conventional low water cut-off device 136 having a controller 150 and a live probe sensor 134, respectively, such as may be used in the prior art hot water boiler system 100 of FIG. 1.

The low water cut-off controller 150 of FIG. 3A comprises a control housing 152 containing a control transformer 154, a control relay 156, a wiring terminal strip 158, and an access/mounting holes 159 for the live probe 134. The live probe 134 of FIG. 3B comprises a conductive probe 160 insulated within a metal body 162 attached to a mounting plate 164. The mounting plate 164 of the live probe 134 is brought to a ground potential at 166, by affixing the mounting plate 164 within the control housing 152, inserting the probe 134 within a separate boiler well or opening (as in FIG. 1), and attachment of one or more ground screws 167. A wire 168 from the coil of the relay 156 connects to the wing nut 169 on a threaded portion of the conductive probe 160. For simplicity and clarity, not all wires are shown in the controller 150.

In operation, transformer 154 supplies voltage through the coil of the relay 156 to the live conductive probe 160, which is mounted into the boiler 100 and insulated from equipment ground 166. If there is water 110 in the boiler 100, current will flow through the coil of relay 156 and the live probe 134 through the water 110 to ground 166, pulling in the relay 156 and passing line voltage power (e.g., 120 VAC) to the burner 106.

Thus, in the conventional boiler system configuration 100, separate water temperature and pressure sensing and water presence detection may be required for operation in a safe manner. Accordingly, added devices, and related equipment costs, including added mounting costs are typically needed in a prior art system. In addition, if the probe/sensor (e.g., 124/134) is located some distance away from the HVAC controller (e.g., 120/150), electrical noise and other such signals may also be impressed on the interconnection wires and may decrease the signal-to-noise ratio of the received signal.

Figure 4A:
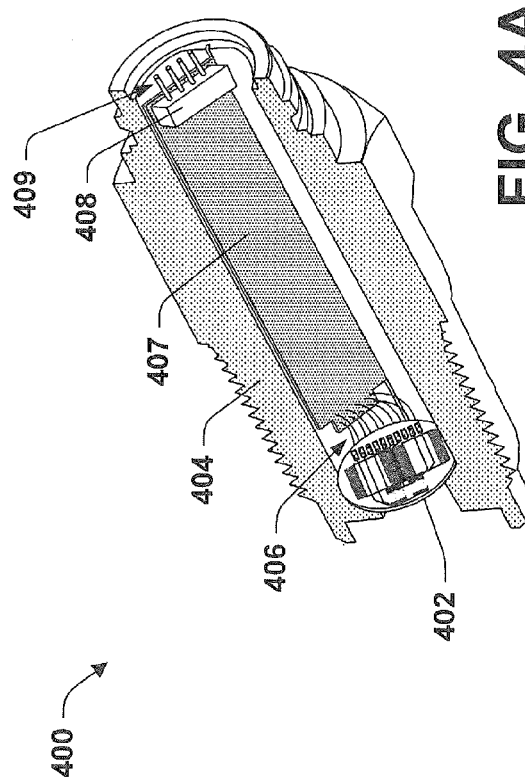
FIGS. 4A-4C illustrate an isometric cross-sectional diagram, end and side views, respectively, of an exemplary multi-sensor component used in accordance with an aspect of the present invention, the sensor having a temperature detector, a heater and a pressure detector provided within a single housing, such as may be used in a fail-safe manner to monitor the temperature, pressure and the presence of an object or medium within an HVAC system.
Figure 4C:
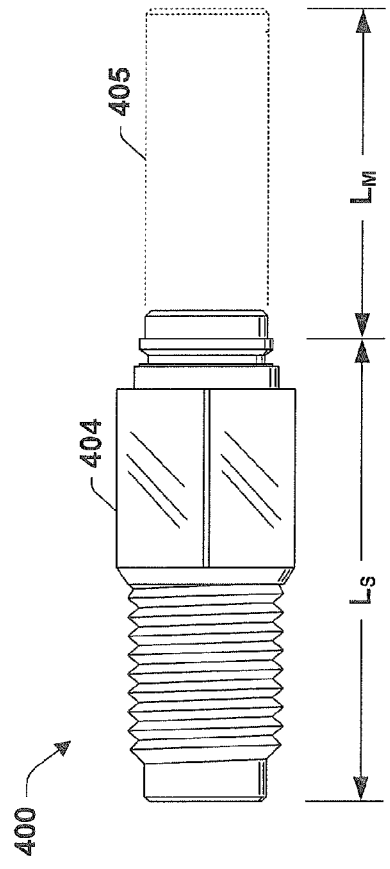
Figure 4B:
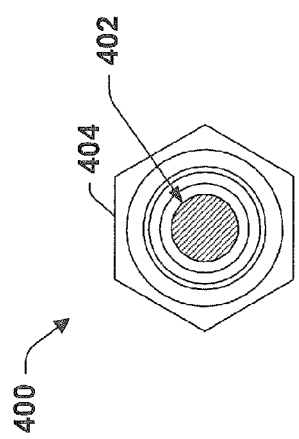

FIGS. 4A-4C illustrate an isometric cross-sectional diagram, end and side views, respectively, of an exemplary multi-sensor component 400 used in accordance with an aspect of the present invention. The multi-sensor component (or sensor) 400 comprises a sensor assembly 402 comprising a temperature detector, a heater and a pressure detector provided within a single sensor housing (or spud) 404, such as may be used in a fail-safe manner to monitor the temperature, pressure and the presence of an object or medium (e.g., 110) within an HVAC system. The multi-sensor component 400 may also comprise a controller or analyzer 407 (e.g., microprocessor, PIC, microcomputer, computer, PLC, e.g., on a printed circuit board, PCB) connected to the sensor assembly 402 via interconnect wiring 406. The controller 407 may further comprise control circuitry and an algorithm operable to condition and provide outputs for temperature, pressure and presence signals from the temperature and pressure detectors, for example, onto a bus 409 by way of a bus connector 408. Other such connectors and bus configurations are also contemplated within the context of the present invention.

The multi-sensor component 400 may have a basic sensor length $L_S$, or optionally, may be provided having an optional extension 405 having a mounting length $L_M$, for mounting an optional display panel (not shown) having additional controls and external connection terminals.

Figure 4D:
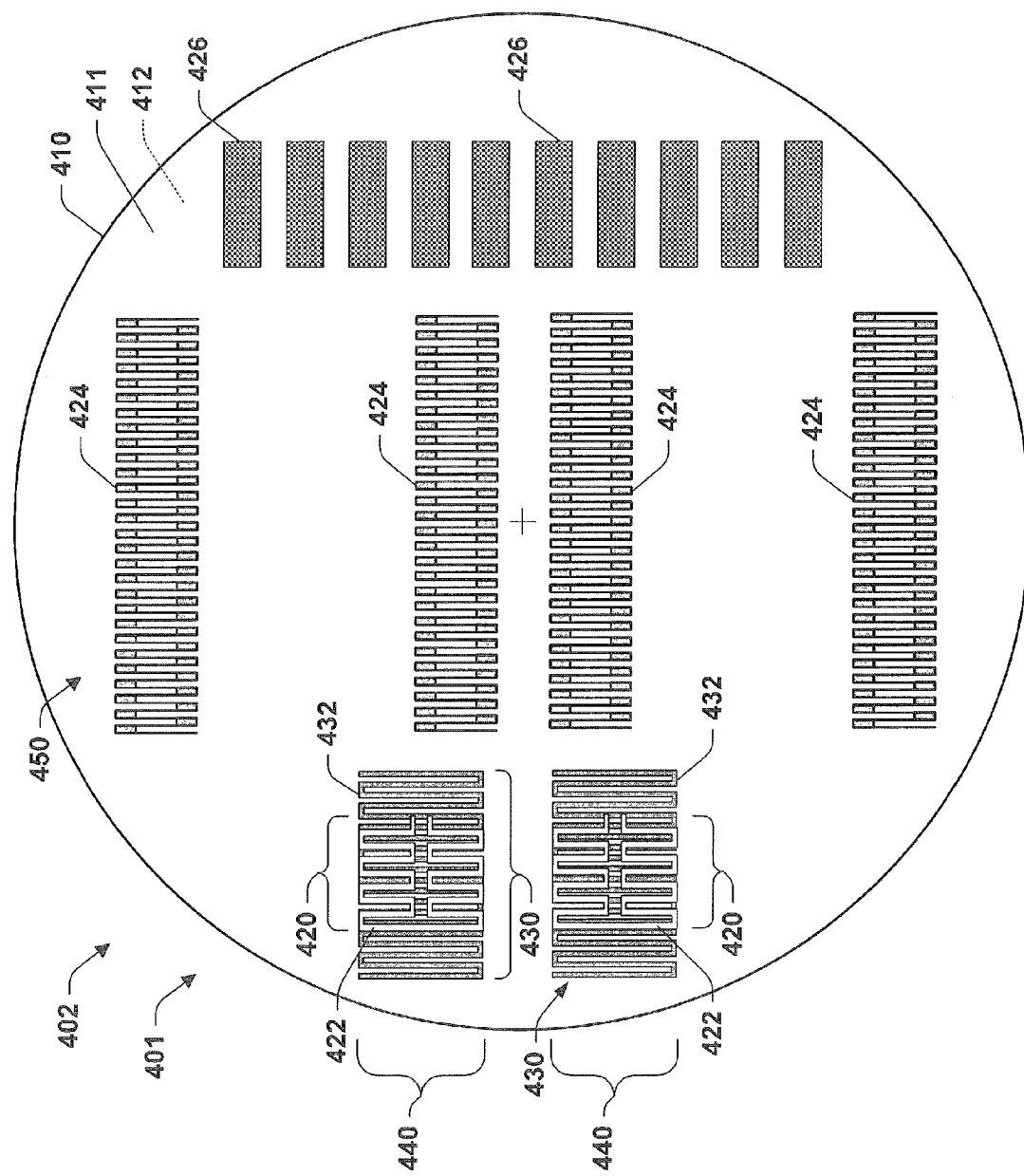
FIGS. 4D and 4E illustrate simplified diagrams of an exemplary sensor assembly sensor pattern and wiring pattern, respectively, of the multi-sensor component of FIGS. 4A-4C used in accordance with an aspect of the present invention, the sensor assembly having a heater, a temperature detector and a pressure detector provided together within a single sensor housing and/or on a common substrate, such as may be used to monitor the temperature, pressure and the presence of an object or medium within an HVAC system.
Figure 4E:
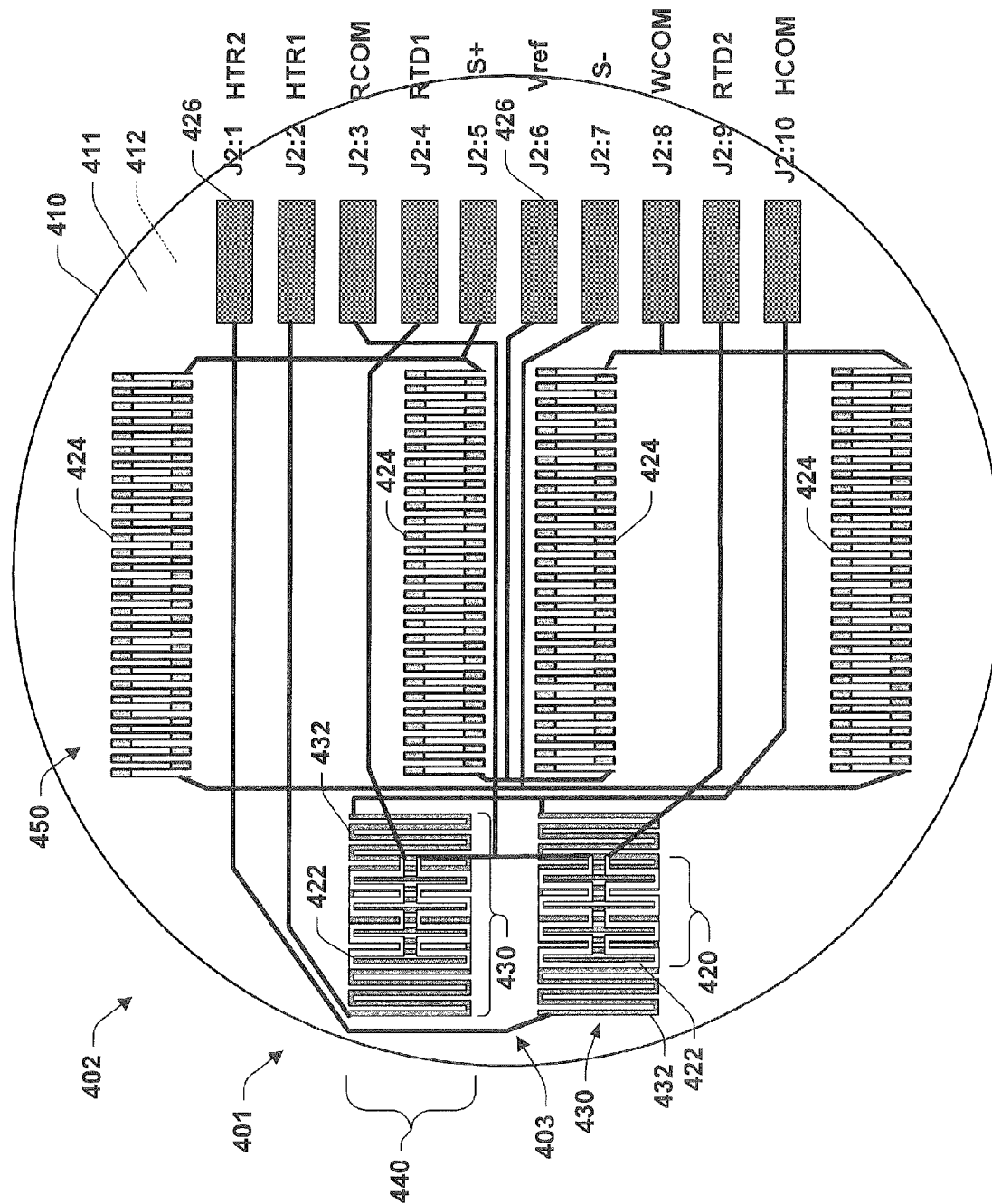

FIGS. 4D and 4E illustrate simplified diagrams of an exemplary sensor assembly 402, a sensor pattern 401 (FIG. 4D) and a wiring pattern 403 (FIG. 4E), respectively, of the multi-sensor component 400 of FIGS. 4A-4C used in accordance with an aspect of the present invention. The sensor assembly 402, again, comprising a temperature sensor 420, a heater 430, and a pressure detector 450 provided together within a single sensor housing 404 and/or on a common substrate 410, such as may be used to monitor the temperature, pressure and the presence of an object or medium within an HVAC system, such as the boiler system 100 of FIG. 1.

In one implementation, the temperature sensor 420 of the multi-sensor component 400 may comprise one or more (e.g., 2) temperature detector elements 422, the heater 430 may comprise one or more (e.g., 2) heater elements 432, and the pressure detector 450 may comprise two or more (e.g., 4) strain gauge elements 424. For example, the pressure detector 450 of FIGS. 4D and 4E comprises four strain gauge elements 424 interwired together by wiring pattern 403 of FIG. 4E configured as a full-wave strain gauge bridge or Wheatstone bridge 450. The configuration of the Wheatstone bridge 450 as a pressure detector is well known in the art and provides a high level of pressure signal for a given strain on the substrate or disc 410 to which the strain gauge elements are affixed. The substrate/disc 410, for example, may comprise a ceramic, stainless steel, silicon, a composite, a fiber reinforced composite, and metal material. Preferably, the substrate materials generally comprise a relatively high tensile strength to take the flexure of the medium pressure, as well as a high thermal conductivity to quickly and accurately convey the temperature of the object or medium to the temperature and presence detectors.

In one embodiment, the single or common substrate 410 (one common substrate between the various elements/detectors) has wet 412 and dry 411 opposing sides, having the wet side 412 in direct contact with a medium (e.g., water, Freon, ammonia, or alcohol, refrigerant, water-glycol mixture) or an object (e.g., a heat exchanger, an outlet plenum, an air stream, a chamber wall, and a stack of a furnace system). In this embodiment, the temperature sensor 420, the heater 430 and the pressure detector 450 are affixed onto the dry side 411 of the single/common substrate 410. The temperature sensor 420 and the heater 430, together, also comprise a presence detector 440, as will be discussed further in association with FIG. 4J.

In the illustrated embodiments, the substrate 410 effectively serves as one wall (e.g., the outer wall) of the sensor housing 404, and is accordingly made relatively thin so as to flex in response to pressure changes measured by the pressure detector 450, and to also rapidly thermodynamically transfer the present temperature of the medium/object to the temperature sensor 420.

It will be appreciated that in the present context and description above that "wet and dry opposing sides" refers more to the function of the particular side in terms of which side faces the medium/object (wet side 412), and upon which side the detectors and heater are affixed (dry side 411), rather than which side may physically become "wet or dry". However, in the illustrated examples, the "dry side" 411 upon which the detectors and heater are affixed generally is kept substantially dry simply as a result of the physical construction of the enclosed sensor housing 404. In addition, the opposing "wet side" 412 may physically become "wet" if the medium is water, but conversely may effectively stay "dry" if the medium is Freon, a refrigerant, a gas or air, or if the wet side 412 is used to sense an object such as a heat exchanger, an outlet plenum, an air stream, a chamber wall, and a stack of a furnace system, for example.

In one implementation, the temperature sensor 420 of the multi-sensor component 400 may comprise one or more temperature detector elements 422 comprising one or more of an RTD, a PTC thermistor, an NTC thermistor, a platinum or nickel resistance wire element, a thermocouple, and an integrated circuit temperature detector, or a combination thereof, preferably in close thermal proximity to the heater 430. For example, FIGS. 4D and 4E illustrate that one such temperature detector 422 directly overlies one heater element 432, the combination thereby comprising a presence detector 440.

In another implementation, the heater 430 of the multi-sensor component 400 may comprise one or more heater elements 432 comprising one or more of a Platinum or nickel resistive element, a PTC thermistor and an integrated circuit heater, or a combination thereof, operable to heat the multi-sensor component to an expected temperature as measured by the temperature sensor 420. In another embodiment, the heater 430 may also serve as a temperature sensor 420 when the heater 430 is not being heated.

In another embodiment, the substrate 410 of the multi-sensor component 400 may further comprise conductive material bond pads 426 (e.g., Ti, Ni, Cu, Pt or Au) coupled by way of the conductive interwiring 403 (e.g., Ti, Ni, Cu, Pt or Au) to the various elements of the temperature sensor 420, the heater 430 and the pressure detector 450. The conductive bond pads 426 provide an external means of electrical connection to the temperature sensor 420, the heater 430 and the pressure detector 450 affixed to the dry side 411 of the substrate 410, for example, to the controller/PCB 407 by way of interconnect wiring 406.

In yet another embodiment, the multi-sensor component 400 may comprise one or more temperature detectors 420, one or more heaters 430 and one or more pressure detectors 450 as individual devices affixed within the sensor housing 404, affixed to an interior wall of the sensor housing 404, or a combination thereof. For example, a pressure detector 450 may be affixed to an interior wall of the sensor housing 404, and a presence detector 440 comprising a temperature sensor 420 intimately thermally paired with a heater 430 may be individually affixed within the sensor housing 404, yet separate from the pressure detector 450.

In still another embodiment, the multi-sensor component 400 may comprise a presence detector 440 individually affixed within the sensor housing 404, while a separate individual pressure detector 450 may be affixed, bonded, or deposited onto a substrate 410 as indicated above, the substrate acting as one wall of the sensor housing 404 having a dry side 411 and an opposing wet side 412.

In one embodiment the one or more temperature detectors 420, one or more heaters 430 and one or more pressure detectors 450 as individual devices may be cast or potted together within the sensor housing 404, for example, using silicon rubber, thermal epoxy, or a ceramic material to provide a close thermal union between the elements. The close thermal union between the temperature detector and the heater provides a quick and more accurate thermal response therebetween and to the surrounding environment or medium.

It is a goal in one aspect of the present invention to minimize the distance and maximize the thermal union between the temperature sensor 420 and the heater 430. It is another goal in one aspect of the present invention to minimize the mass of the temperature sensor 420 and the heater 430. In these ways, the responsiveness of the multi-sensor component 400 to the surrounding medium (e.g., 110, 510) or object, and to each other of the elements therein may be maximized. A thin substrate such as the substrate 410 illustrated and described herein provides these goals.

Figure 4F:
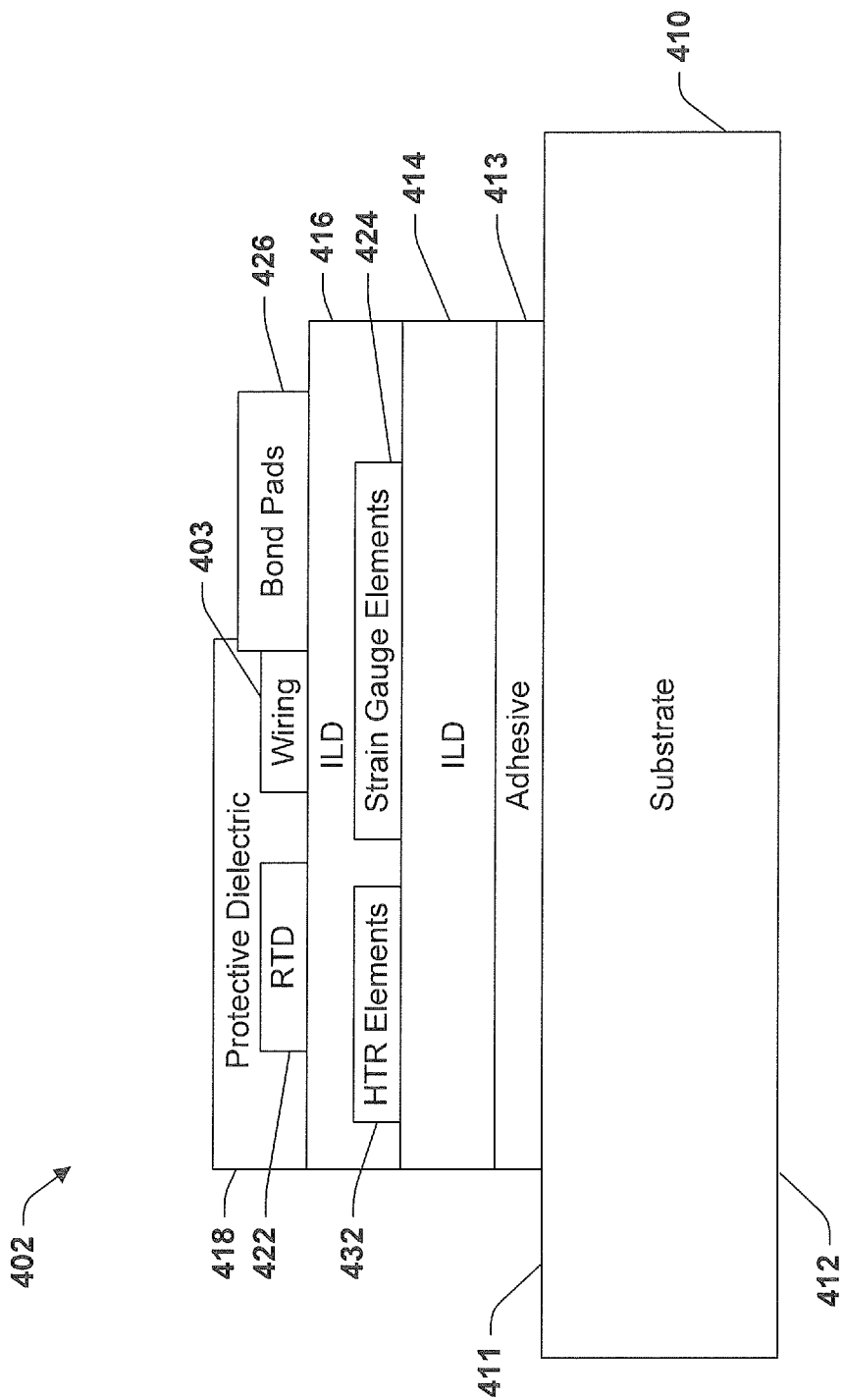
FIGS. 4F, 4G and 4H illustrate cross-sectional diagrams of exemplary sensor assemblies such as that of FIGS. 4A, 4B, 4D and 4E affixed onto the dry side of a single substrate used in accordance with one or more aspects of the present invention.
Figure 4G:
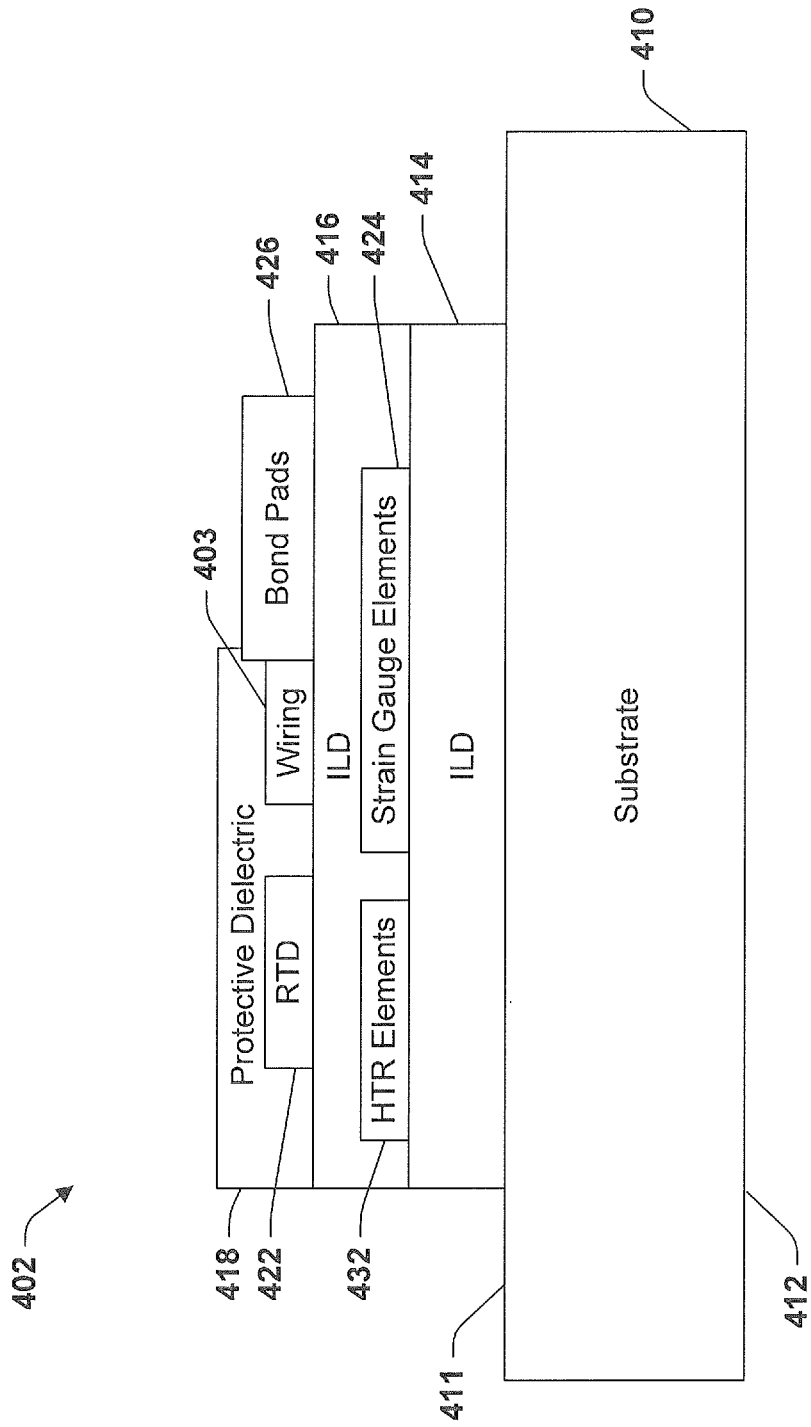
Figure 4H:
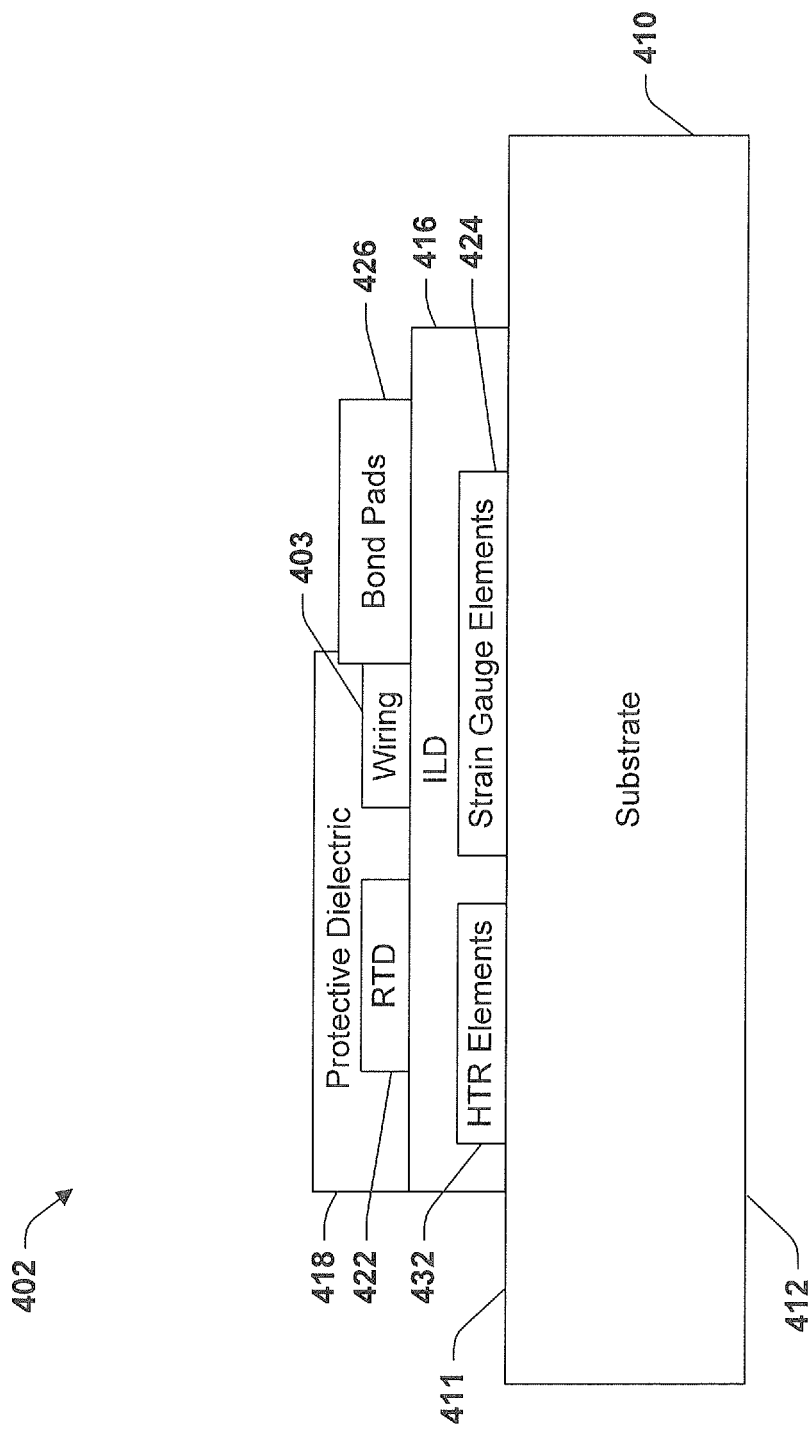

FIGS. 4F, 4G and 4H further illustrate cross-sectional diagrams of exemplary sensor assemblies 402 such as those of FIGS. 4A, 4B, 4D and 4E affixed onto the dry side 411 of a single (common) substrate 410 of the multi-sensor component 400, used in accordance with one aspect of the present invention. (The various material layer thicknesses illustrated are exaggerated for the purpose of illustration.)

FIGS. 4F, 4G and 4H also illustrate several exemplary layering techniques, wherein the temperature sensor 420, the heater 430 and the pressure detector 450 may be deposited as one or more metals directly onto the dry side 411 of the substrate 410 (FIG. 4H), to a dielectric material which has been deposited onto the dry side 411 of the substrate (FIG. 4G), or to a dielectric (e.g., Kapton) material surface which is molecularly bonded or glued onto the dry side 411 of the substrate 410 (FIG. 4F).

For example, in FIGS. 4F and 4G, if the substrate 410 comprises a conductive material such as stainless steel or another such metal to separate the wet (opposing) side 412 in contact with the object or medium (e.g., 110) being sensed, from the dry (facing) side 411, a dielectric (electrically insulative material, Kapton, SiO2, Sapphire, SU2008) or first interlayer dielectric layer (ILD) 414 is affixed, deposited or spun onto the substrate 410 either directly as in FIG. 4G, or glued via a high temperature adhesive 413 to the substrate 410 as in FIG. 4F. First ILD layer 414 therefore provides electrical isolation of the sensor pattern 401 and wiring pattern 403 from the conductive substrate 410.

In one embodiment, the strain gauge elements 424 and heater elements 432 are deposited as metals (e.g., Pt, Ni or Au via vacuum vapor deposition) onto the first ILD layer 414 along with any conductive interwiring 403, and then covered with a second ILD layer 416. RTD elements 422 (e.g., Nickel) may then be applied (e.g., via vacuum vapor deposition) over the heater elements 432. Additional interwiring layers 403 may be applied together with the RTD elements 422, or separately, depending on the thickness desired, to provide adequate conductivity between the detector/heater elements and bond pads 426 which are also applied over ILD layer 416. A protective dielectric layer 418 is then applied over all the sensor pattern 401 and wiring pattern 403 elements, but leaves at least a portion of the bond pads 426 exposed for wire bonding.

In FIG. 4H, for example, if the substrate 410 comprises an insulative or otherwise non-conductive material such as a ceramic, composite, fiber reinforced composite, silicon, fiberglass, or another such generally high tensile strength, high thermal conductance material to separate the wet (opposing) side 412, from the dry (facing) side 411, a first interlayer dielectric layer (ILD) 414 may not be required for electrical isolation. However, the inventors appreciate that an RMS smoothness of less than about 15 micro-inches may still be needed for adequate subsequent depositions of the sensor pattern 401 and wiring pattern 403. The strain gauge elements 424 and heater elements 432 may again be deposited as described above as metals (e.g., via vacuum vapor deposition) along with any conductive interwiring 403, directly onto the insulative substrate 410, and then covered with a second ILD layer 416.

Again as above, RTD elements 422 may then be applied (e.g., via vacuum vapor deposition) over the heater elements 432. Additional interwiring layers 403 may be applied together with the RTD elements 422, or separately, depending on the thickness desired, to provide adequate conductivity between the detector/heater elements and bond pads 426 which are also applied over second ILD layer 416. A protective dielectric layer 418 is then applied over all the sensor pattern 401 and wiring pattern 403 elements, but leaves at least a portion of the bond pads 426 exposed for wire bonding.

Alternately, the ordering of the layers for the heater elements 432 and the RTD's 422 may be reversed or inverted. The sensor pattern 401 and wiring pattern 403 elements may also be applied on the same layer.

Figure 4J:
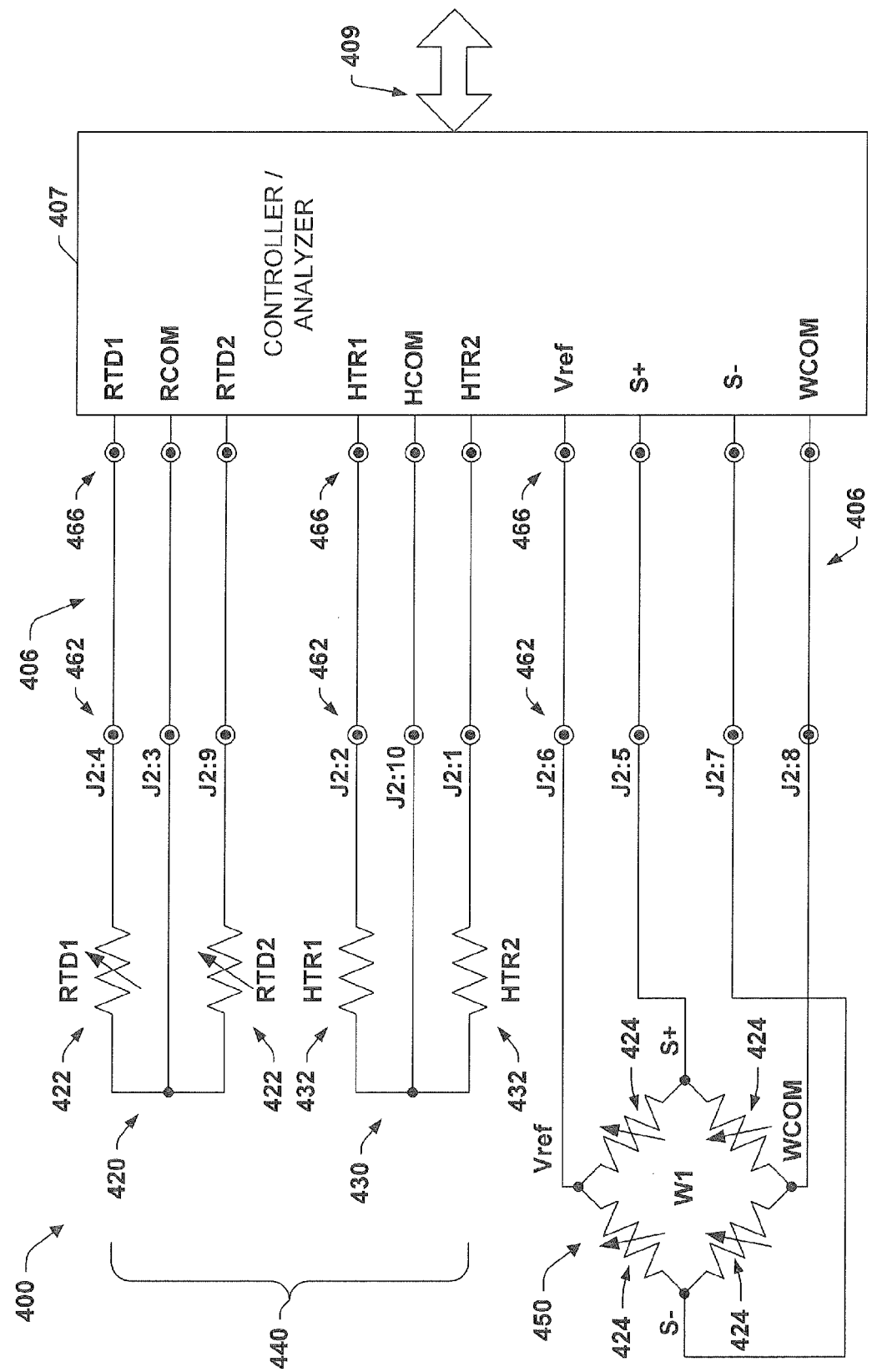
FIG. 4J illustrates a schematic diagram of the multi-sensor component of FIGS. 4A-4C used in accordance with an aspect of the present invention.

FIG. 4J illustrates a schematic diagram of the multi-sensor component 400 of FIGS. 4A-4C used in accordance with an aspect of the present invention. Multi-sensor component 400 of FIG. 4J comprises a temperature sensor 420, a heater 430 and a pressure detector 450 all coupled via interconnect wiring 406 to the controller/analyzer 407 having an I/O bus 409, for example, a 2-8 wire I/O bus 409. The temperature sensor 420 and the heater 430 collectively comprise a presence detector 440. The detectors and heater of the sensor assembly 402, terminate at junction terminals 462 (J2:1-10), and are coupled to terminals 466 of the controller/analyzer 407 via interconnect wiring 406.

The temperature sensor 420 of multi-sensor component 400 of FIG. 4J further comprises resistive thermal detectors RTD1 and RTD2 (422) coupled together at a common node ROOM, in effect forming a three terminal temperature detector. The heater 430 of multi-sensor component 400 of FIG. 4J further comprises heater elements HTR1 and HTR2 (432) coupled together at a common node HCOM, in effect forming a three terminal heater. Pressure detector W1, 450 of multi-sensor component 400 of FIG. 4J further comprises a full-wave Wheatstone strain gauge bridge comprising four strain gauge elements 424. The Wheatstone bridge 450, for example, receives a voltage reference (Vref) and common (WCOM) voltage from the controller/analyzer 407, and in response to an induced strain produced by the pressure of the medium (or an object), outputs at bridge nodes S+ and S− a pressure signal back to the controller/analyzer 407.

The controller 407 of the multi-sensor component 400 comprises control circuitry and an algorithm, for example, provided on a PCB, configured and operable to independently monitor and compare temperature signals from temperature detectors RTD1 and RTD2 (422) in order to achieve redundant and fail safe operations, to condition the temperature signals, and to provide a conditioned temperature signal output therefrom. For example, to achieve the failsafe/redundant operations, the controller 407 may comprise an independent amplifier circuits each operable to individually monitor the resistance of the temperature detectors RTD1 and RTD2 (422). If an expected resistance from one of the temperature detectors 422 can not be achieved, the controller 407 is configured and operable to issue a temperature detector or sensor failure alarm signal and/or to subsequently rely on the remaining good temperature detector(s) for future temperature sensing operations.

The controller 407 also comprises a regulated current source and current measuring means operable to provide a measured current from the regulated current source to each of the heaters HTR1 and HTR2 (432) in order to achieve redundant and fail safe operations of the heaters 432. For example, to achieve the failsafe/redundant operations, the controller 407 is operable to individually drive heaters HTR1 and HTR2 (432) while measuring the current to each heater. If an expected current to one of the heaters 432 can not be achieved, the controller 407 is configured and operable to issue a heater or sensor failure alarm signal and/or to subsequently rely on the remaining good heater(s) for future sensor heating operations.

The controller 407 of the multi-sensor component 400 further comprises control circuitry and an algorithm, operable to supply a regulated reference signal between terminals Vref and WCOM of the Wheatstone bridge W1 of the pressure detector 450, and to amplify and measure a differential strain gauge signal associated with a pressure signal between terminals S+ and S− of the Wheatstone bridge W1 of the pressure detector 450. The controller 407 is also configured and operable to condition the pressure signal, and to provide a conditioned pressure signal output therefrom. If pressure signal indicates an overpressure condition, the controller 407 is further operable to issue an overpressure alarm signal.

The controller 407 of the multi-sensor component 400 is also configured and operable to provide the temperature, pressure and presence signals from the temperature and pressure detectors, for example, onto a bus 409 by way of a bus connector 408.

Thus, the multi-sensor component 400 may be used as a single sensing device to monitor the temperature, pressure and the presence of water in a hot water boiler system 500 as will be discussed further in association with FIG. 5 infra.

The particular arrangement of the multi-sensor component 400 of the present invention permits the temperature sensor 420 to sense the surrounding temperature (object or medium), while the heater 430 provides heat to the multi-sensor component 400, thereby providing temperature regulation to an expected or predetermined temperature as measured by the temperature sensor 420. Measurement using the temperature sensor 420 at the expected temperature, when heated by the heater 430 and also when allowed to cool to the temperature of the medium/object, indicates the responsiveness of the temperature sensor 420 and provides a level of confidence that the temperature sensor 420 is working properly and providing an accurate temperature measurement. In addition, when power is removed from the heater 430, the temperature response, such as a temperature change, a rate of change or a time constant (TC) of the thermal decay rate may be computed by the controller/analyzer (e.g., 407) based on two or more temperature measurements, to indicate whether an object or medium (e.g., a heat sink, heat exchanger, water) is present surrounding the sensor, or if it is absent. For example, a high (rapid, short) TC temperature decay rate may indicate the sensor is immersed in water (indicating the medium is present), while a low (slow) TC rate may indicate the sensor is in air (indicating the medium is absent).

In a preferred implementation, the wet side 412 of the multi-sensor component 400 is mounted thru an opening in the boiler tank wall (e.g., 102, 502) to directly contact the boiler water (e.g., 110, 510), thereby inherently providing intimate thermal contact with the medium (e.g., 110, 510).

In another embodiment and mode of temperature detector redundancy, when power is removed from the heater 430, the controller/analyzer 407 is further configured and operable to measure the resistance of the heater 430 to provide a temperature detector measurement similar to that of temperature sensor 420 described above. Thus, each heater element 432 of heater 430 may also be used as a combination heater 430 and temperature detector, providing further fail-safe operations and sensor redundancy benefits if needed.

In one optional mode of operations of multi-sensor component 400, a temperature sensor 420 or heater 430 confidence check, for example, may be made immediately after removing the heater power supply from the heater, and before the multi-sensor component 400 has had a chance to cool significantly. However, in some medium/object situations, the temperature response (e.g., time constant TC) of multi-sensor component 400 may be too high (rapid, short) to make an accurate measurement practical after power removal. Alternately, therefore, the current and voltage going into temperature sensor 420 may both be monitored and the resistance calculated during the heating phase to provide continuous temperature monitoring from the resistance calculation.

Figure 4K:
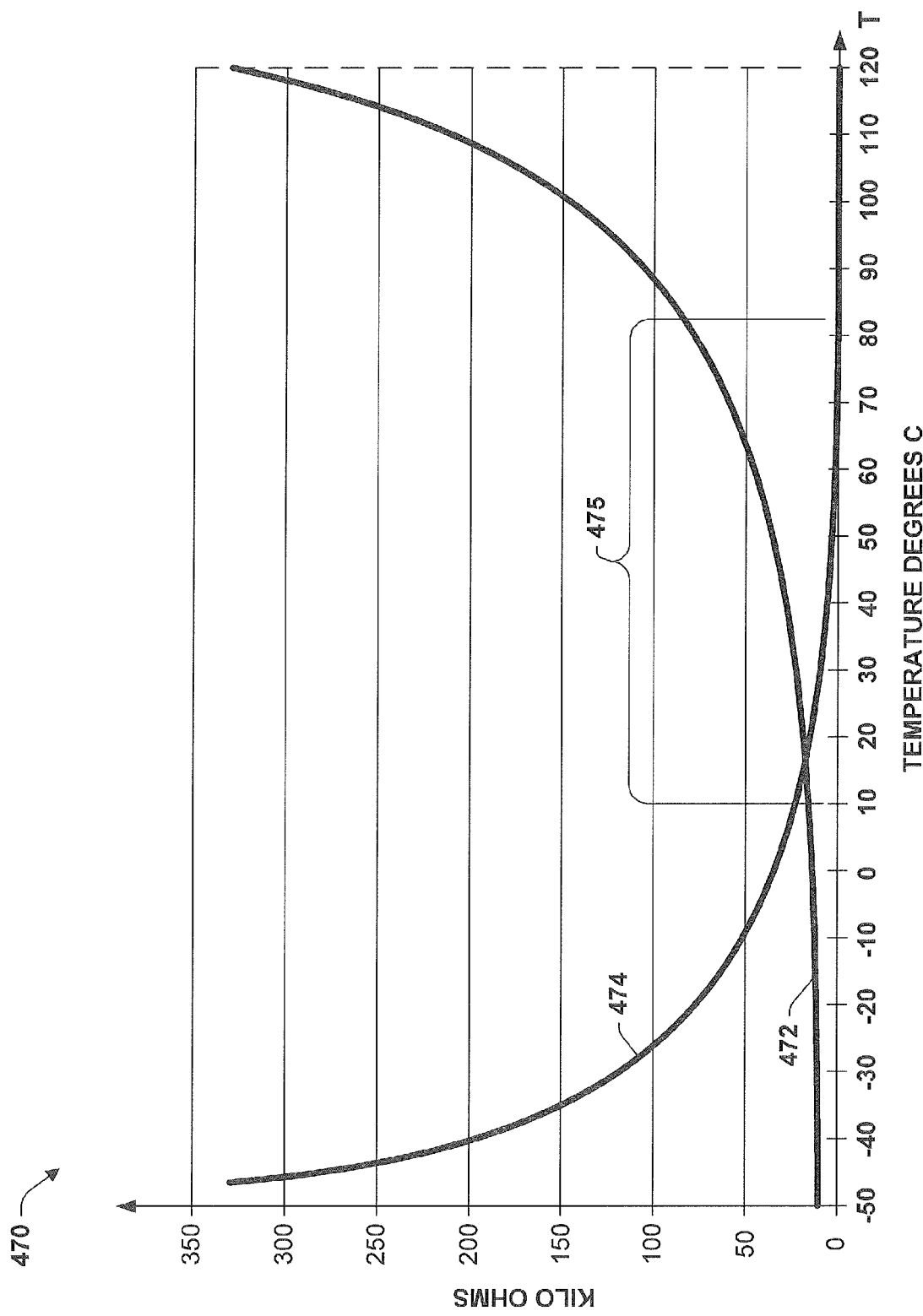
FIG. 4K is a plot of an exemplary Resistance Temperature Detector (RTD) or an NTC resistive element exhibiting a decreasing change in resistance as the temperature increases such as may be used in an NTC temperature sensor, such as may be used together with and heated by a resistive heating element, and a PTC resistive element exhibiting an increasing change in resistance as the temperature increases, respectively, in accordance with one or more aspects of the present invention.

FIG. 4K illustrates a plot 470 of an exemplary Resistance Temperature Detector (RTD) comprising an negative temperature coefficient (NTC) resistive element 474 exhibiting a decreasing change in resistance as the temperature (T) increases such as may be used in an NTC type temperature sensor 420, and such as may be used together with and heated by a resistive heating element 432, in accordance with one or more aspects of the present invention. FIG. 4K further illustrates a positive temperature coefficient (PTC) resistive element 472 exhibiting an increasing change in resistance as the temperature increases such as may be used in a PTC type temperature sensor 420, in accordance with another aspect of the present invention. Either an NTC or a PTC type RTD may be utilized in the present invention, however, the better Platinum RTD's are generally of the NTC variety.

A typical operating range 475 for a hot water boiler system is also illustrated ranging from about 10° C. to about 82° C. (about 50-180° F.).

Figure 4L:
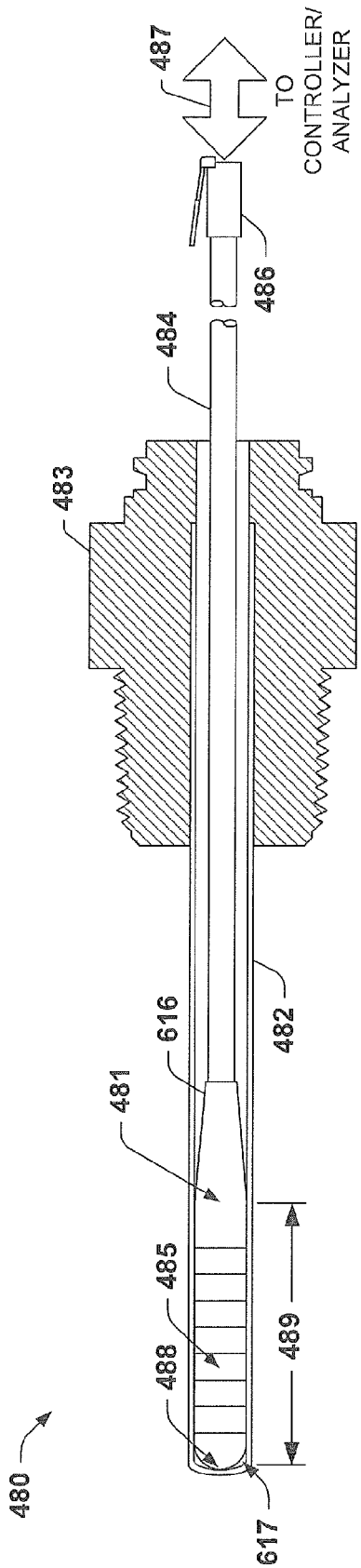
FIGS. 4L and 4M are diagrams of another embodiment of an exemplary multi-sensor component and sensor assembly, respectively, residing on a single printed circuit board substrate and affixed within a single sensor housing and/or thermo-well combination, such as may be used in accordance with one or more aspects of the present invention.
Figure 4M:
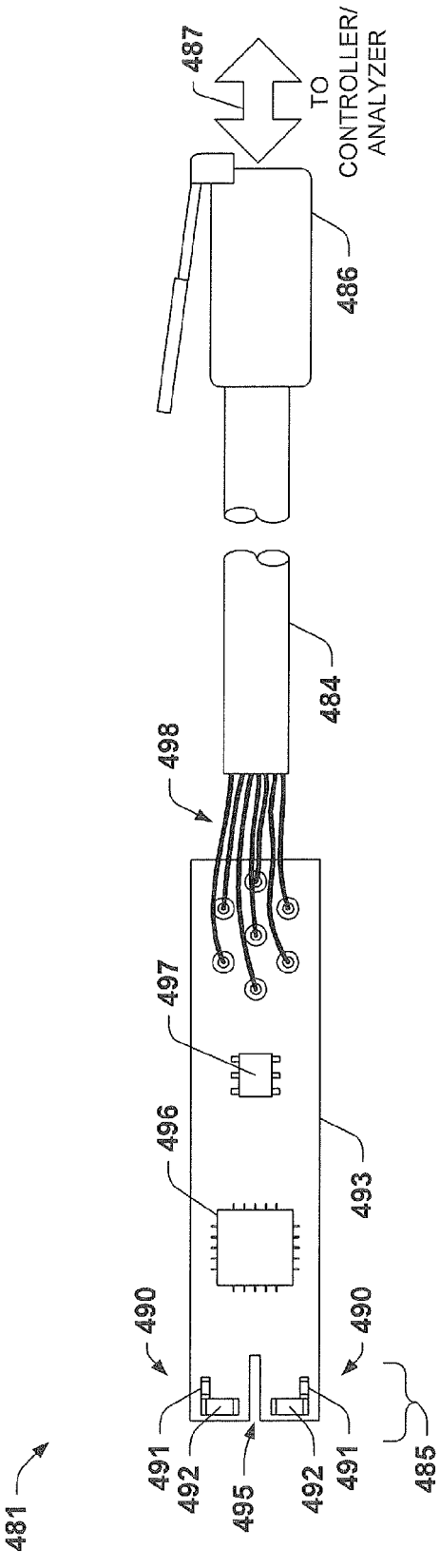

FIGS. 4L and 4M illustrate another embodiment of an exemplary multi-sensor component 480 comprising a multi-sensor assembly 481, respectively. The multi-sensor assembly 481 portion of the multi-sensor component 480 also comprises a sensor assembly 485 and a sensor monitor 496 residing together on a single printed circuit board or another such substrate 493, which are affixed within a single sensor housing and/or thermo-well combination 482, held in place, for example, by a brass fitting 483.

For example, the sensor assembly 485 may comprise one or more detectors such as a plurality of temperature detectors 490 operable to measure a temperature of an object or medium (e.g., 110), a presence detector (e.g., 440) operable to detect the presence of the object or medium 110 in thermal contact with the exemplary multi-sensor component 480, and a pressure detector (e.g., 450) operable to measure a pressure of the medium against the multi-sensor component 480. The temperature detectors 490, for example, may individually include a temperature sensor 491 and a heater 492 affixed together on the substrate 493 and having close thermal union or thermal communication with one another, such as is shown in FIG. 4M, wherein the temperature sensor 491 and the heater 492 physically contact one another. The heater 492 may include one or more resistors or other such resistive heating elements. The plurality of temperature detectors 490 of FIG. 4M are configured, for example, to reside on the same substrate 493 affixed within the same sensor housing or thermo-well or combination 482/483 of the multi-sensor component 480.

The temperature sensor 491 of the temperature detectors 490, for example, may include an NTC thermistor or an RTD, whose resistance predictably varies with temperature.

The presence detector (e.g., 440 of FIGS. 4D-4J), may include a heater 430/492 such as a resistive element 432 and a temperature sensor 422/491 as discussed above in association with FIGS. 4D-4J. Also discussed above, the pressure detector 450 may comprise a full-wave strain gage bridge such as four vapor-deposited Platinum resistive elements 424 interconnected together in a full-wave strain gage bridge configuration, as shown in FIG. 4J.

Figure 7A:
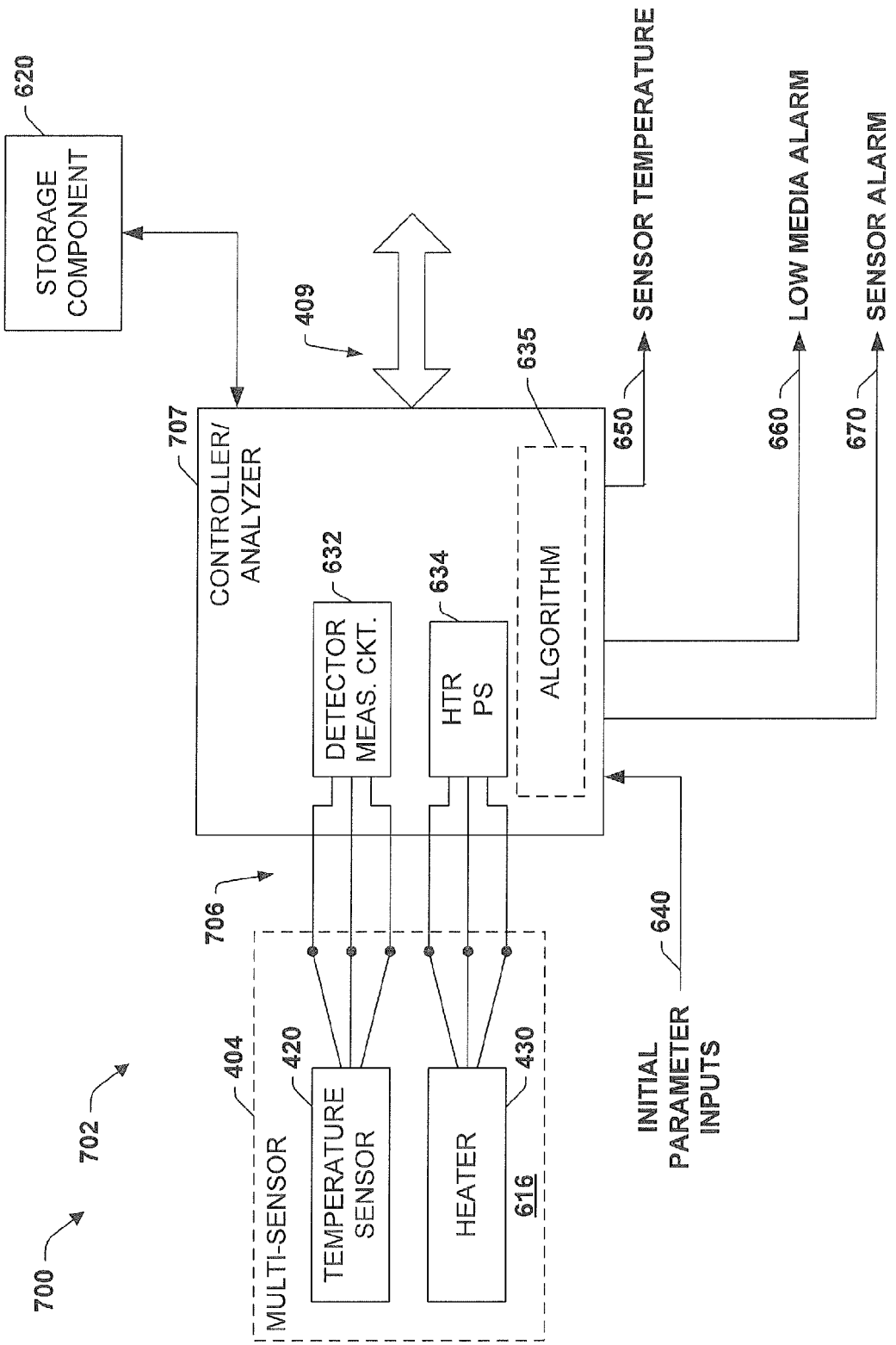
FIG. 7A is a simplified block diagram of an equivalent circuit of an exemplary multi-sensor component of the present invention of FIGS. 4A-4C for monitoring the temperature and presence of an object or medium, and for detecting sensor degradations and predicting failures in accordance with another aspect of the present invention.
Figure 7B:
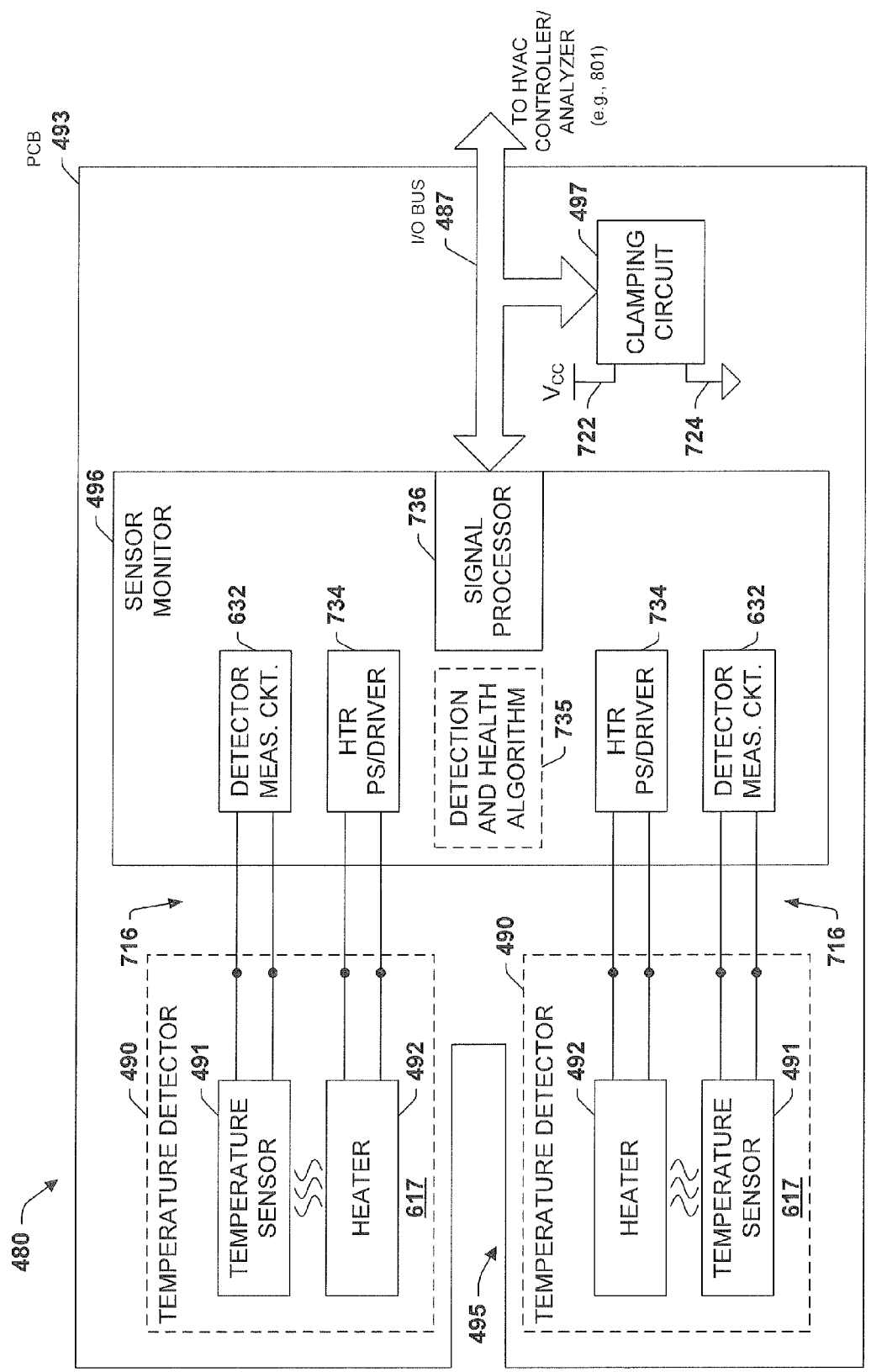
FIGS. 7B and 7C are simplified block diagrams of equivalent circuits of an exemplary multi-sensor component of FIGS. 4L and 4M using redundant temperature sensing circuits for monitoring and measuring the temperature of an object or medium, for processing and clamping the temperature signals, and for detecting sensor degradations in order to verify the health of the sensors in accordance with another aspect of the present invention.

The sensor monitor 496 of FIGS. 4M and 7B, is coupled to the one or more detectors of the sensor assembly 485, and is configured to use a detection algorithm or detection and health algorithm (e.g., 735 of FIG. 7B) operable to detect one or more of the temperature, pressure and presence of the object or medium in contact with the multi-sensor component 480. The sensor monitor 496 is also configured to verify a health of the one or more detectors of the sensor assembly 485, for example, using the detection and health algorithm (e.g., 735 of FIG. 7B).

For example, in a temperature measuring mode, the sensor monitor 496 of FIG. 4M is configured to measure the resistance of each of the NTC thermistors used in the temperature sensors 491 of the two temperature detectors 490, and to average these measurements together, using the detection algorithm, into an average temperature signal, for example, before formatting the sensor signal. The use of two or more of a plurality of temperature detectors 490 may be used to provide temperature measurement redundancy.

To verify a health of the one or more detectors of the sensor assembly 485 using, for example, the detection and health algorithm (e.g., 735 of FIG. 7B), the sensor monitor momentarily or periodically selects one of the plurality of temperature detectors for the health verification and applies a predetermined amount of energy to the heater 492 of the selected temperature detector 490. The sensor monitor 496 then measures and analyzes the temperature response of the selected temperature sensor 491 to determine if the temperature response exceeds one of an allowable temperature change (ΔT), a rate of change (ΔTdt), or a time constant (Tc) of a thermal rise rate of the selected temperature detector 490. The determination as to one of these changes then corresponds to a health verification of the selected temperature detector 490.

In one embodiment, the multi-sensor assembly portion 481 of FIG. 4M of the multi-sensor component 480 may be affixed together within a casting or potting material 616 (e.g., silicon rubber, thermal epoxy, or ceramic material), which may then be butted against the end 488 of the sensor housing or copper well tube 482 used as a thermo-well. A conductive grease 617 applied to the thermal contact area 489 of the thermo-well 482 is used to provide a close thermal union between the potted multi-sensor assembly 481 and the sensor housing or thermal well 482/483.

FIG. 4M further illustrates that the multi-sensor component 480 may also include an interconnect cable 484 comprising wires 498 that may be coupled to the printed circuit board substrate 493 for circuit connection between the sensor monitor 496 and a controller/analyzer (e.g., Beckett AquaSmart 801 of FIG. 8) via a bus 487 and sensor connector 486. In one embodiment, the bus 487 communicates a bi-directional formatted sensor signal between the multi-sensor component 480 and the Beckett AquaSmart 801 controller/analyzer. The fitting 483 (e.g., brass fitting) may be used to hold the thermo-well (e.g., a copper tube) housing the multi-sensor assembly 481 into the wall of a boiler (e.g., 500 of FIG. 5), to measure the temperature and/or presence of a water media (e.g., 510) within the boiler.

In another embodiment, a notch 495 may be provided in the PCB substrate 493 of the multi-sensor assembly 481 to help thermally isolate two individual temperature detectors 490 of the multi-sensor component 480.

Figure 7C:
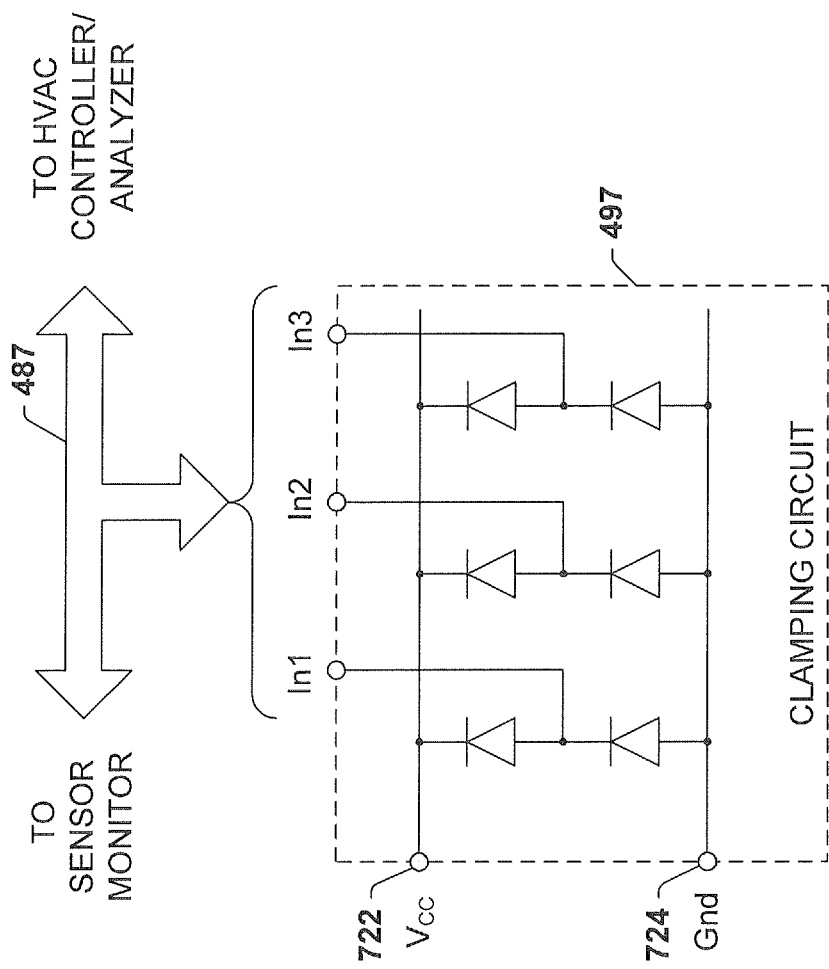
Figure 8:
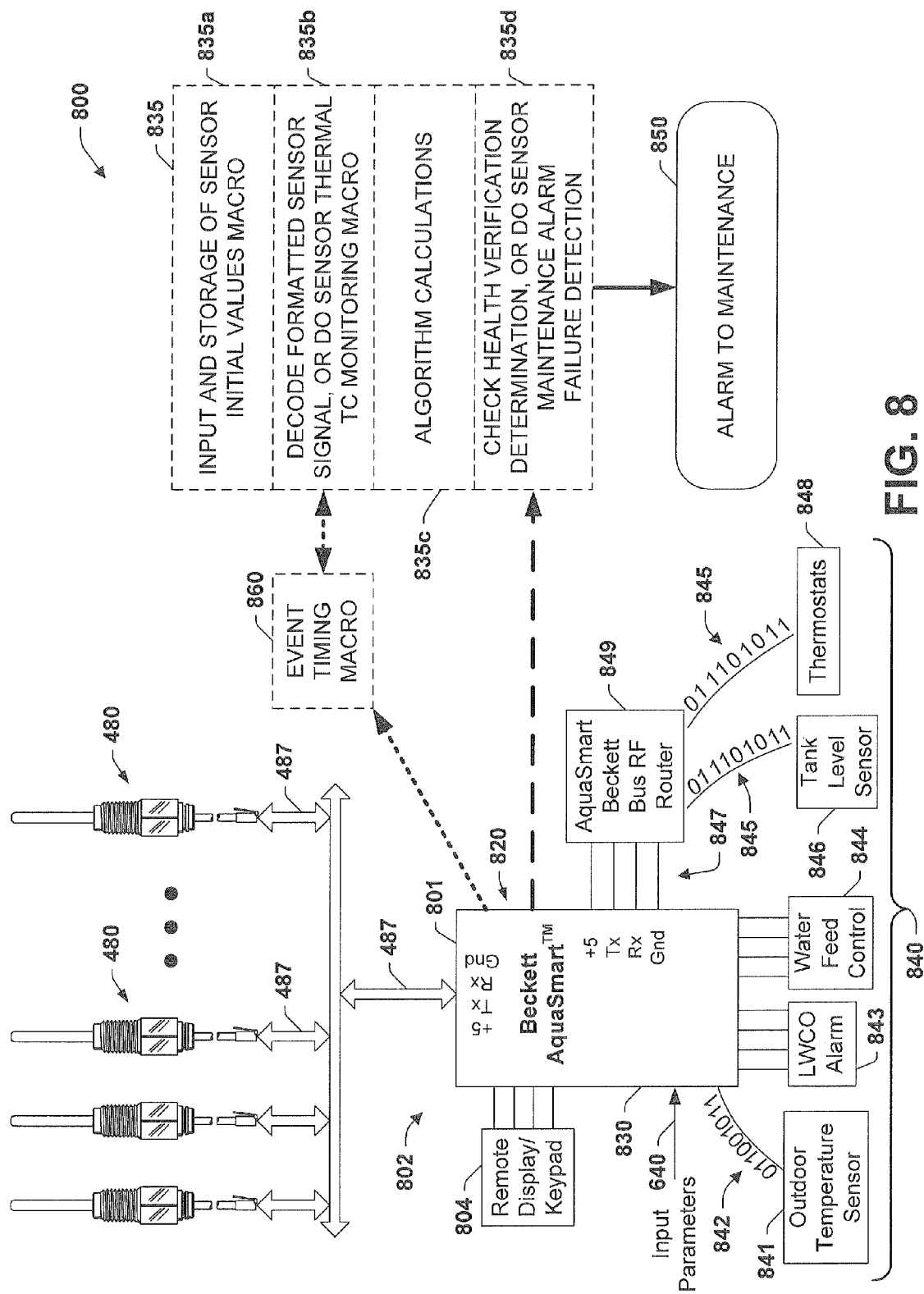
FIG. 8 is a functional diagram of an exemplary multi-sensor component monitoring system and illustrating a method for monitoring, analyzing, and detecting sensor temperature, medium pressure and presence, and verify the health of one or more of a plurality of multi-sensor components, in accordance with an aspect of the present invention.

In yet another embodiment, and as shown in FIG. 4M and FIG. 7C, the multi-sensor component 480 may also include a clamping circuit 497 coupled to the I/O bus 487 to clamp or limit noise, over-voltages or under-voltages between the sensor monitor 496 and a controller/analyzer (e.g., 801 of FIG. 8). The clamping circuit 497 may shunt the noise, over-voltages or under-voltages to a supply voltage 722 or a ground potential 724 of a power supply, as shown and described infra in association with FIG. 7B.

Figure 5:
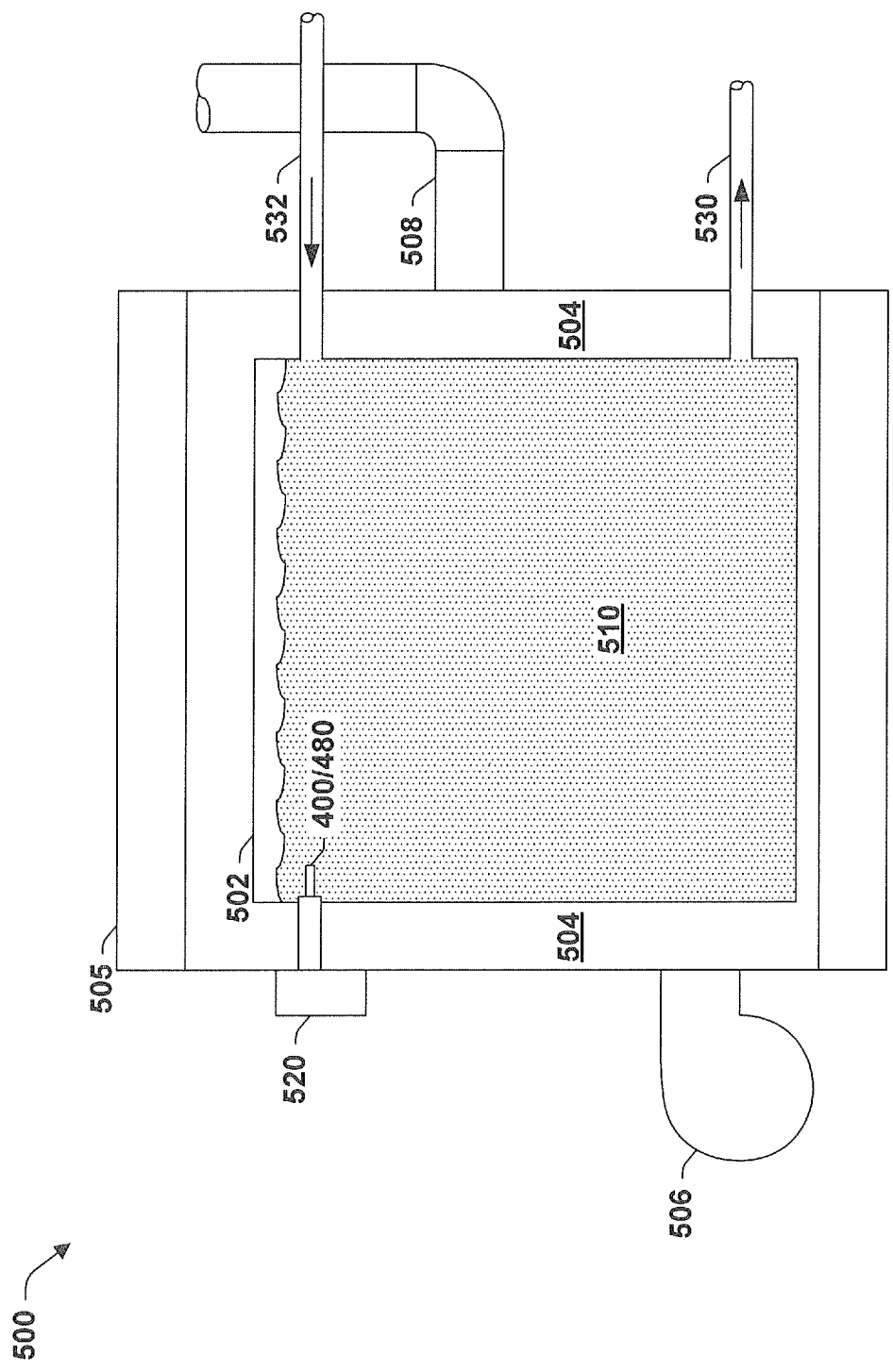
FIG. 5 is a simplified diagram of an exemplary hot water boiler system using a single multi-sensor component for measuring a temperature and pressure of the water and for detecting the presence of the water in the boiler, the functions provided together in a single fail-safe multi-sensor component.

FIG. 5 illustrates an exemplary hot water boiler system 500, utilizing a single fail-safe multi-sensor component similar to that of 400 of FIGS. 4A-4J or 480 of FIGS. 4L and 4M, for measuring a temperature and pressure, and detecting the presence of the water in the boiler 500 in a fail-safe manner in accordance with the present invention. Other such HVAC systems may also incorporate the fail-safe multi-sensor component 400/480 of the present invention to help regulate the temperature and level of a medium (e.g., water, Freon, ammonia, or alcohol) used in the HVAC system.

The exemplary boiler 500 of FIG. 5 comprises a boiler tank 502 surrounded by an insulating material layer 504 within a boiler enclosure 505. A burner 506, having a flue vent 508, heats water 510 within the tank 502 to a temperature set by a temperature, pressure and presence sensing control/display device 520. The temperature, pressure and presence sensing control/display device 520 comprises a fail-safe multi-sensor component 400/480, having a temperature sensor 420 that changes in resistance when heated to actuate a high/low limit temperature monitoring circuit or another such analyzer (not shown) for control of the system about a temperature set point. The heated water 510 is circulated through a feed water line 530 to an external heat exchanger (not shown) and the cooled water returns to the boiler through a supply/return line 532. If the level of the water 510 within the boiler tank 502 drops below the level of the multi-sensor component 400/480, the burner 506 may be shut-down by the temperature, pressure and presence sensing control/display device 520 until additional water 510 is added to the boiler 500 to maintain safe operation and avoid boiler damage.

The multi-sensor component 400 of the temperature, pressure and presence sensing control/display device 520 also has a heater 430 that is used to cyclically heat and cool the multi-sensor component 400. As the multi-sensor component 400 cools in each thermal cycle, the change in temperature is monitored by the controller/analyzer 407 using the change in resistance of the temperature sensor 420. From the temperature measurements, the controller/analyzer 407 then computes the temperature response such as a temperature change, a rate of change or a thermal decay rate time constant (TC) of the multi-sensor component 400, to determine whether water 510 is present surrounding the multi-sensor component 400. If water 510 is not present at the multi-sensor component 400 (indicating a low water condition), the burner 506 is shut-down until additional water 510 is added, thereby maintaining fail-safe operation of the boiler system 500. Further, the health of the multi-sensor component 400 may also be ascertained by using the temperature sensor 420 to monitor the heater 430 within the multi-sensor component 400, after thermal equilibrium is established at the expected regulation temperature. Thus, in accordance with several aspects of the present invention, the fail-safe multi-sensor component 400 may be used to detect the temperature and presence of a medium in an HVAC system in a fail-safe manner.

In another implementation of the present invention, the temperature and presence of a heat exchanger (not shown) may be detected using the multi-sensor component 400 of the present invention. As a heat exchanger (e.g., comprising a high thermal conductivity metal with fins) is likely to produce a higher thermal decay rate than that of water or another such medium, the temperature swing produced by the heater 430 of the multi-sensor component 400, is also likely to be low. Thus, the regulation temperature of the heater 430 may be shifted to a significantly lower temperature level when used in the determination of health of the temperature sensor 420. Further, the presence detection algorithm as it may be applied to a heat exchanger application may be somewhat limited to determining whether there is adequate thermal union between the multi-sensor component 400 and the heat exchanger. For example, if the multi-sensor component 400 has slipped out of contact with the heat exchanger, the thermal TC would be greatly reduced and a presence determination therefore would indicate that the medium (e.g., the heat exchanger) is not present.

Figure 6:
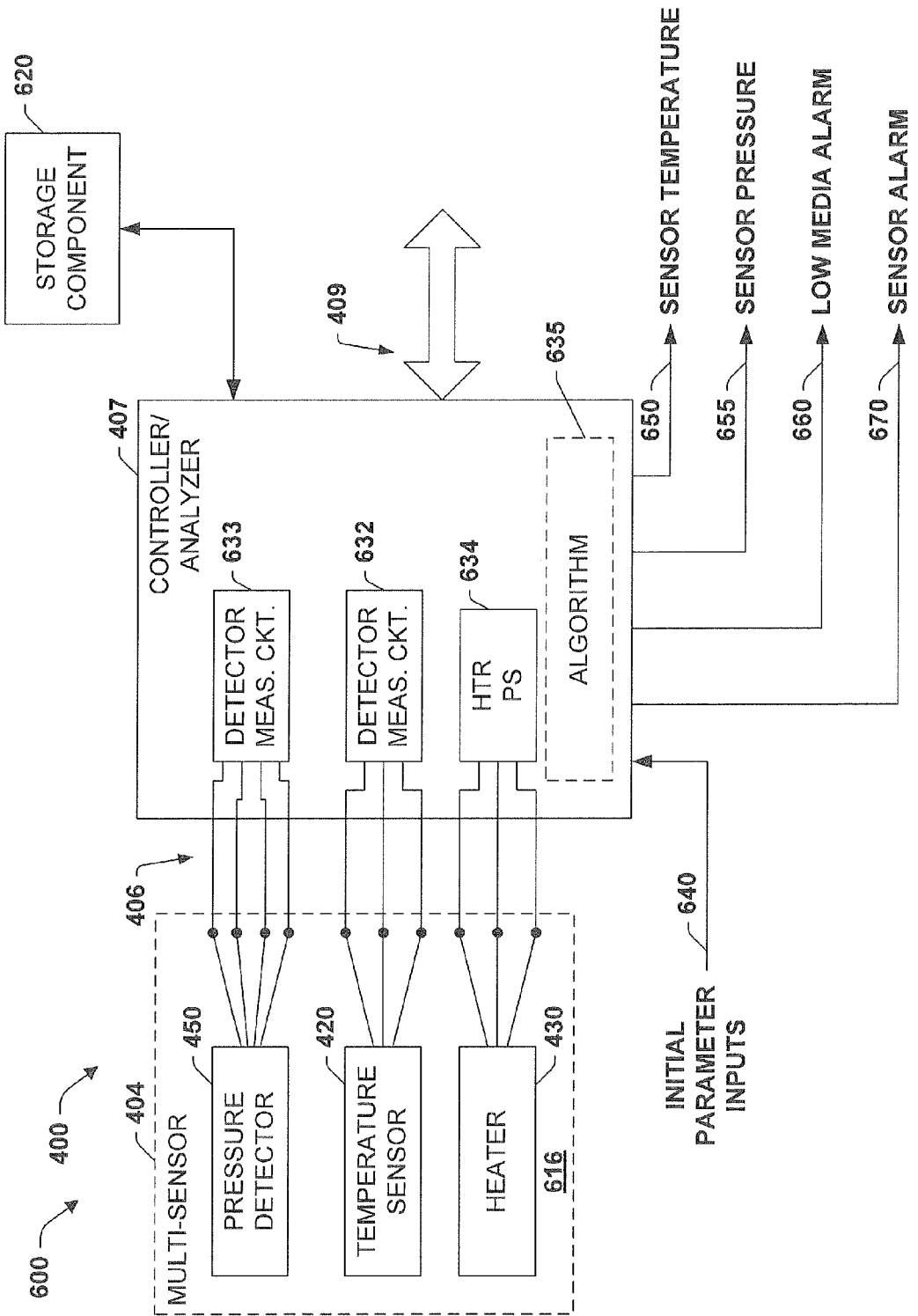
FIG. 6 is a simplified block diagram of an equivalent circuit of an exemplary multi-sensor component of the present invention of FIGS. 4A-4C for monitoring the temperature, pressure and presence of an object or medium, and for detecting sensor degradations and predicting failures in accordance with an aspect of the present invention.

FIG. 6 illustrates further details of an exemplary temperature, pressure and presence sensing system 600 using the multi-sensor component 400 of FIGS. 4A-4C for measuring temperature, pressure and for detecting the presence of a medium/object and for detecting sensor degradations and predicting failures in accordance with an aspect of the present invention.

Similarly, FIG. 7A illustrates details of an exemplary temperature and presence sensing system 700 using a multi-sensor component 702 which is similar to the multi-sensor component 400, but has no pressure detector 450, multi-sensor component 702 used for measuring a temperature and for detecting the presence of a medium/object and for detecting sensor degradations and predicting failures in accordance with an aspect of the present invention.

Both multi-sensor component 400 of system 600 of FIG. 6, and multi-sensor component 702 of system 700 of FIG. 7A, respectively, comprise a temperature sensor 420 and a heater 430, however, only multi-sensor component 400 of system 600 comprises a pressure detector 450. In one embodiment, the multi-sensor components 400/702 of FIGS. 6 and 7, respectively, further comprise the temperature sensor 420 and/or the pressure detector 450, and the heater 430 affixed together within a casting or potting material 616 (e.g., silicon rubber, thermal epoxy, or ceramic material), or conductive grease 617 to provide a close thermal union between the two elements. In another embodiment, the temperature sensor 420 and/or the pressure detector 450, and the heater 430 may be, for example, affixed, bonded, deposited, or glued together onto the dry side 411 of a substrate such as substrate 410 of FIGS. 4A, 4B, 4D-4H.

The controller/analyzer 407 of FIG. 6, and controller/analyzer 707 of FIG. 7A is operable to monitor the resistance measurements of the temperature sensor 420 or the heater 430, respectively, and provide associated temperatures. Controller/analyzer 407 of FIG. 6 is also operable to measure a differential strain gauge based pressure signal from the pressure detector 450 and provide a pressure of the medium/object. As system 700 of FIG. 7A does not use a pressure detector 450, the interwiring 706 between the multi-sensor component 702 and the controller/analyzer 707 may have fewer wires. Then, using the resistance measurements or the temperatures, the analyzer is further operable to compute the temperature response, for example, a thermal decay rate time constant (TC) of the multi-sensor component 400/702 to determine whether a medium or object is present at the multi-sensor component 400/702. Further, the health of the multi-sensor component 400/702 may also be ascertained with the assistance of the controller/analyzer 407/707 (e.g., microprocessor, PIC, microcomputer, computer, PLC), by monitoring the temperature sensor 420 or the heater 430, and comparing the temperature indicated to the temperature of the heater 430 after thermal equilibrium is established at the expected regulation temperature.

For example, system 600 of FIG. 6 and 700 of FIG. 7A both comprise a fail-safe multi-sensor component 400 or 702, respectively, connected to a controller/analyzer 407/707 (e.g., microprocessor, PIC, microcomputer, computer, PLC). The controller/analyzer 407/707 is further operably coupled to a storage component 620 (e.g., memory) for storage of initial input parameters 640 (e.g., initial resistance of the detector at a certain temperature, expected regulation temperature, low medium alarm levels or acceptable TC levels for the presence of a object or medium, acceptable sensor degradation % levels, etc.). Controller/analyzer 407/707 further comprises a detector measurement circuit 632 for monitoring the temperature of the temperature sensor 420 of system 700 or the heater 430 (acting as the temperature detector) of system 700. Controller/analyzer 407 also comprises a detector measurement circuit 633 for monitoring the pressure of the pressure detector 450 of multi-sensor component 400. Controller/analyzer 407/707 also includes a controllable heater power supply 634 (e.g., 5 VDC, 120 VAC) to supply a voltage or current to the heater 430 (e.g., resistance wire, thermistor, integrated circuit heater) for heating the multi-sensor component 400/702 to an expected temperature.

Controller/analyzer 407/707 further comprises an algorithm 635 (e.g., a program, a computer readable media, a hardware state machine) that is applied to the respective system to calculate and analyze the temperature monitoring, pressure, presence detection, and/or sensor degradation and failure prediction. Upon completion of such calculations and/or analysis, the algorithm 635 provides several possible output results from the controller/analyzer 407/707 that may include a present sensor temperature 650 (e.g., 180° F.), a sensor pressure/sensor overpressure 655 (e.g., 200 PSI), and if a predetermined limit has been achieved, a low medium alarm 660 (e.g., low water cut-off level, medium absent), and/or a sensor alarm 670 (e.g., sensor or system failure imminent, sensor maintenance required) may be issued. In addition, controller/analyzer 407/707 is also configured and operable to communicate with an input/output bus 409 such as a 4-wire digital bus to supply the above outputs and/or to receive the initial parameter inputs 640.

Alternately, and as indicated previously, in addition to the temperature sensor 420 measurements, the current and voltage going into the heaters 430 of multi-sensor component 400/702 may be monitored and the resistance calculated during the heating phase to provide continuous temperature monitoring based on the resistance calculation.

In another embodiment of the present invention, the multi-sensor component 400/702 may comprise an integrated circuit heater and/or detector further operable, for example, to digitally communicate to the controller/analyzer 407/707 a temperature signal, a pressure, a sensor parametric input, a sensor model, a sensor serial number, a manufacturing date, and a calibration temperature, for example.

FIGS. 7B and 7C illustrate simplified block diagrams of equivalent circuits of the exemplary multi-sensor component 480 of FIGS. 4L and 4M, and the clamping circuit 497 of FIG. 4M, respectively, in accordance with another aspect of the present invention.

As described in association with FIGS. 4L and 4M, the exemplary multi-sensor component 480 of FIG. 7B is configured to utilize redundant temperature detectors 490 (e.g., 2 or more detectors) and a sensor monitoring circuit 496 for detecting and measuring the temperature of an object or medium 510 using a detector measuring circuit 632 and a detection and health algorithm 735. The sensor monitoring circuit 496 is also configured to verify the health of the detectors 490 using a heater power supply and/or driver 734 and the detection and health algorithm 735. The sensor monitoring circuit 496 is further configured to average the temperature signals from the redundant temperature detectors 490 and to process the average temperature signal and any other included detector signals, into a formatted sensor signal, for example, using a signal processor 736 operable to process (amplify, filter, format, etc.) and communicate the formatted sensor signal onto the I/O bus 487.

For example, in a temperature measuring mode, the sensor monitor 496 of FIGS. 4M and 7B is configured to measure the resistance of each of the NTC thermistors used in the temperature sensors 491 of two temperature detectors 490, and to average these measurements together, using the detection algorithm 735, into an average temperature signal, for example, before formatting the sensor signal. The use of two or more of a plurality of temperature detectors 490 may be used to provide temperature measurement redundancy.

The I/O bus 487 provides bi-directional communication of the formatted sensor signal between the sensor monitor 496 of the multi-sensor component 480, and a controller/analyzer 801 such as the Beckett AquaSmart 801 of FIG. 8.

In yet another embodiment, and as shown in FIGS. 4M, 7B and 7C, the multi-sensor component 480 may further include a clamping circuit 497 coupled to the I/O bus 487 to clamp or limit noise, over-voltages or under-voltages between the sensor monitor 496 and the controller/analyzer 801 of FIG. 8. The clamping circuit 497 of FIG. 7C may be used to shunt the noise, over-voltages or under-voltages on the I/O bus 487 to a supply voltage 722 or a ground potential 724 associated with a power supply, for example, by way of the illustrated six clamping diodes. Although clamping circuit 497 of FIG. 7C illustrates provision for protecting three individual lines (In1, In2, In3, . . . ) of the I/O bus 487, it is appreciated that any number of bus lines may be protected by the illustrated clamping circuit 497 or any other such clamping or protective circuitry.

As indicated above with regard to FIGS. 4L and 4M and as will be discussed later with regard to FIG. 11, the sensor monitor 496 of FIG. 7B is further configured to verify the health of the detectors 490 of the sensor assembly 485 of the multi-sensor assembly 481 of the multi-sensor component 480, for example, using the detection and health algorithm 735. In particular, the algorithm 735 selects and directs a heater power supply 634 and/or an optional heater driver (not shown) to control a selected one of the heaters 492 while monitoring the temperature response of the respective temperature sensor 491 of the selected temperature detector 490.

For example, in a health diagnostic routine or health verification of the one or more detectors 490 of the sensor assembly 485 using the detection and health algorithm 735, the sensor monitor 496 momentarily or periodically selects one of the pluralities of temperature detectors 490 for the health verification. The algorithm 735 then directs the selected heater power supply 634 and/or driver which applies a predetermined amount of energy to the heater 492 of the selected temperature detector 490. Alternately, the selected heater 492 of the selected temperature detector 490 is heated for a predetermined period of time.

The sensor monitor 496 then measures and analyzes the temperature response of the selected temperature sensor 491 using the corresponding detector measuring circuit 632 to determine if the temperature response exceeds one of an allowable temperature change ($\Delta T$), a rate of change ($\Delta Tdt$), or a time constant (Tc) of a thermal rise rate of the selected temperature detector 490. The determination as to one of these temperature response changes then corresponds to a health verification of the selected temperature detector 490.

The health verification determination may then be encoded into a formatted sensor signal which may be communicated over the I/O bus 487 to a controller/analyzer such as a Beckett AquaSmart controller/analyzer 801 of FIG. 8 or the control/display device 520 of FIG. 5. If the health is determined to be OK, further temperature measurements are enabled, however, if the health is determined to not be OK, a temperature detector alarm may be generated to the attached controller/analyzer (e.g., 801).

Thus, the multi-sensor component 480 may be used for measuring a temperature and for detecting the presence of a medium/object and for verification of the health of the one or more detectors 490 of the sensor assembly 485, for detecting sensor degradations and predicting failures in accordance with an aspect of the present invention.

FIG. 8 illustrates an exemplary fail-safe sensor monitoring system 800 similar to those of FIGS. 6 and 7, such as may be used in a larger scale HVAC system having, for example, one or more multi-sensor components 480 and/or boilers 500.

For example, the boiler control system 802 of the sensor monitoring system 800, comprises a boiler controller (Beckett AquaSmart™ controller) 801, configured to monitor the temperature, pressure and presence of a medium, for example, using one or more multi-sensor components 480. The boiler control system 802 either wired or wirelessly monitors an outdoor air temperature sensor OAT 841, to either wired or wirelessly communicate with a remote operator display/keypad 804, to monitor and control the burner 506 and a circulation pump, to monitor and control a water feed control 844 (make-up water supply control), and to provide a low water cut-off alarm (LWCO) 843 as an output to a user alarm system, for example.

In one embodiment, the low water cut-off alarm (LWCO) 843 comprises a device that acts to interrupt power to a burner (e.g., 506) when the presence of the medium or water (e.g., 510) in the boiler (e.g., 500) can no longer be detected. Typically, LWCO 843 may be mounted directly into the boiler at a low water level location, above which the water level is to be maintained.

The boiler control system 802 or the sensor monitoring system 800 may further comprise a bus RF router 849 coupled by way of, for example, a 2 to 8 wire serial bus 847 to the boiler controller 801. The bus RF router 849 is configured to either wired or wirelessly communicate 845 with one or more thermostats 848 located within one or more heated zones, to either wired or wirelessly communicate 845 with a tank level sensor 846 located on a fuel tank associated with the boiler (e.g., 500), and to either wired or wirelessly communicate 845, for example, with a POTs (plain old telephone) Modem having an RF receiver. The POTs Modem, for example, may be coupled with an analog (or digital) public switched telephone network, that is further coupled to a corresponding receiving modem configured to digitally communicate (e.g., via RS232C) with a receiving computer or cell phone, for example, at a remote location.

RF wireless communications with the bus RF router 849 may also be communicated with a Beckett home manager having an RF router and may comprise an application on a PC, and may be managed from a remote location by Beckett for monitoring the health of the heating system, the oil level within the fuel tank, thermostat settings, or alarm conditions, for example, by service men or the home owner.

The fail-safe sensor monitoring system 800 also illustrates a method for monitoring, analyzing, and detecting sensor temperature, pressure, medium presence, and detecting sensor failures in accordance with an aspect of the present invention.

The present invention provides one such method and system for monitoring one or more multi-sensor components and detecting present or impending sensor or HVAC system failures automatically and without disrupting service. Depending on the selected model of the multi-sensor component (e.g., 400, 480, 700), an object or medium detection portion of the algorithm of the present invention utilizes a change in the cool-down temperature response (e.g., a temperature change, a rate of change and time constant) that exceeds a predetermined level based on the sensor temperature measurements in order to detect the presence (or absence) of an object or medium surrounding the sensor. A failure detection portion of the algorithm of the present invention, for example, utilizes a change over time in the warm-up and/or cool-down temperature responses of the sensor temperature measurements to detect an impending multi-sensor component or HVAC system failure. In addition, no change or an extreme change in the warm-up and/or cool-down TC of the sensor temperature measurements may indicate a present sensor or HVAC system failure.

For example, FIG. 8 illustrates one example of a fail-safe sensor monitoring system 800 for monitoring, analyzing, and detecting sensor temperature, pressure, medium presence, for verification of the health of the sensors and/or predicting sensor or system failures in accordance with an aspect of the present invention. The sensor monitoring system 800 comprises a plurality of multi-sensor components 480, a controller/analyzer such as a Beckett AquaSmart controller/analyzer 801, for example, comprising a storage component 820, and an analyzer 830 having an alarm and failure detection algorithm 835 used by the analyzer 830 for calculating sensor temperature responses, for example, comprising a temperature change, a rate of change and a thermal time constant TC and detecting changes in the sensor measurements associated with sensor degradations to make multi-sensor component or system failure predictions. Optionally, the sensor health and failure determinations may be made in the multi-sensor component 480, or in the analyzer 830 of the controller/analyzer (e.g., 400, 707 and 801). The plurality of multi-sensor components 480 are individually operable to monitor and measure a temperature and/or pressure and forward the results by way of a bus 487 (e.g., a digital four-wire bus) coupled to the analyzer 830 of the controller/analyzer (e.g., 400, 702 and 801). The analyzer 830 is operable to receive one or more sensor and parametric inputs 840 (e.g., provided by the manufacturer, or otherwise predetermined) and the results of the temperature and pressure measuring multi-sensor component 480.

The analyzer 830 of the sensor monitoring system 800 of FIG. 8 is further operable to analyze the results of the plurality of multi-sensor components 480, and use the alarm and failure detection algorithm 835 together with the sensor and parametric inputs 840 to compute and store the computed, predetermined, acceptable thermal TC levels, and other input parameters 640 at 835a to the storage component 820. The analyzer 830 of the sensor monitoring system 800 is further operable to direct the plurality of multi-sensor components 480 to make additional resistance, current and voltage measurements within each detector (e.g., 400, 702 and 490) and to analyze and determine using the alarm and failure detection algorithm 835, a limit check for a sensor maintenance alarm 835d. The analyzer 830 is also operable to make a health verification, a sensor maintenance alarm or failure prediction 835d of the sensor or system 800, and issue an alarm condition to maintenance 850 if a predetermined acceptable limit has been achieved or exceeded, for example, by calculations 835c. For example, when a predetermined failure level is reached, maintenance may be alerted to check or replace one or more of the plurality of multi-sensor components 480, to check for contaminate build-up on the sensor, or alternatively to check for loose terminal connections or broken wires of the bus 487.

In another aspect of the present invention, an event timing macro 860 may be further added to control how often a sensor thermal TC measurement is made via a sensor thermal TC monitoring macro 835b. For example, timings ranging from continuous thermal TC measurements to once per day, or once per thermal process cycle may be enabled with the event timing macro 860. Similarly, pressure measurements and pressure detector trends may be monitored, timed and recorded.

Another aspect of the invention provides a methodology for monitoring, analyzing, and detecting the temperature, pressure and presence of a object or medium in a multi-sensor component or a sensor monitoring system as illustrated and described herein, as well as other types of temperature and pressure monitoring systems.

In one embodiment, the method may rely on a change that exceeds a predetermined level in the cool-down thermal TC as an indicator of the presence or absence of an object or medium surrounding the sensor and of the sensor health. For example, after measurements and calculations, a high slope thermal TC indicates the presence of a medium (or object) at the sensor, while a low slope thermal TC indicates the absence of the same medium (or object). However, if no slope or an extremely high slope is detected, a sensor or system failure is likely to be indicated. Optionally, a slope that increases or decreases over time is an indicator of, for example, a sensor or system degradation or an impending failure. The method of the present invention utilizes an algorithm to detect sensor temperature and pressure measurements, medium presence, and sensor or system degradations to enable failure predictions as described above.

Figure 9A:
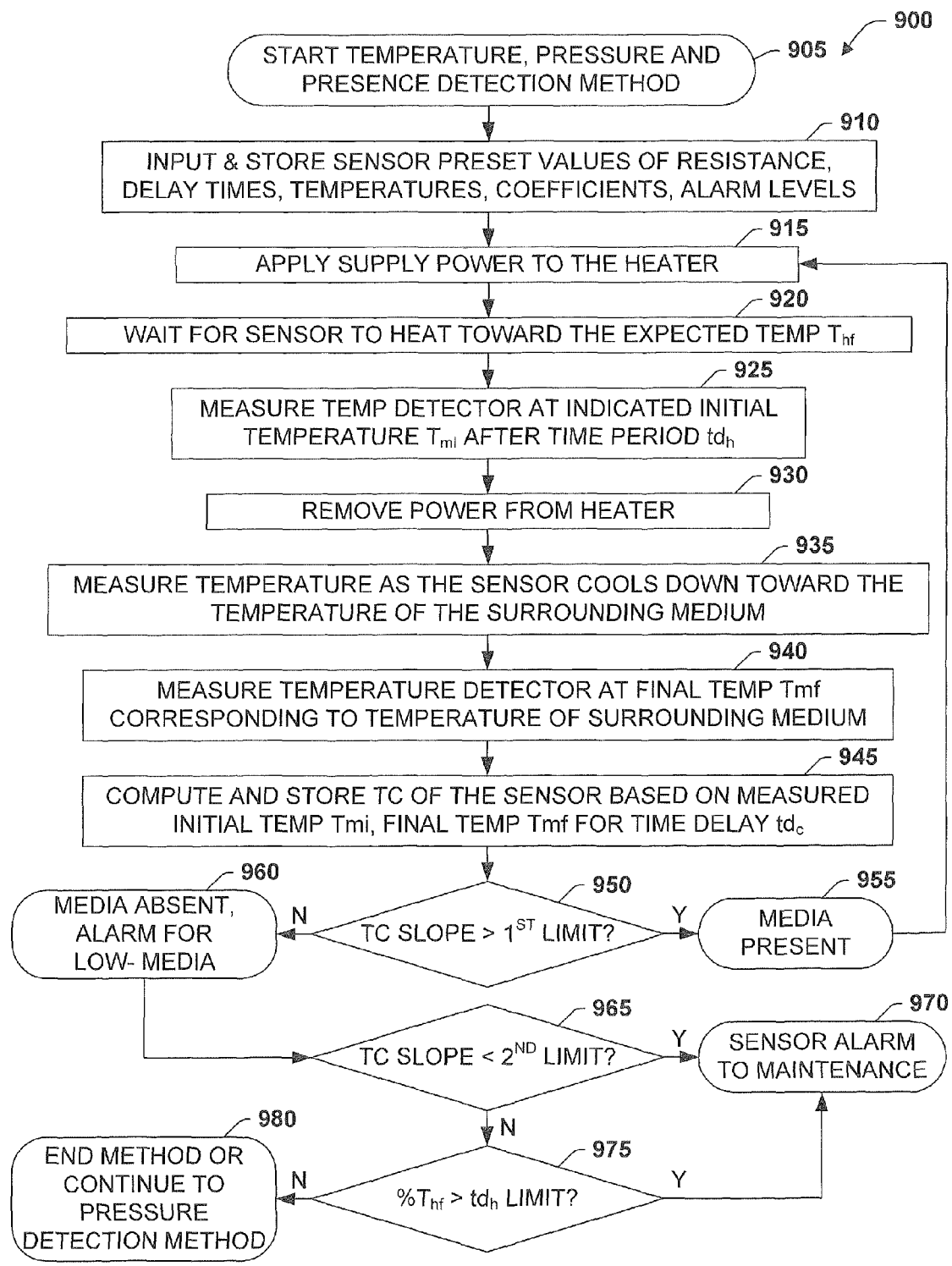
FIGS. 9A, 9B and 9C are flow chart diagrams illustrating methods of detecting a temperature, pressure and presence of an object or medium, and predicting failures in a multi-sensor component monitoring system in a fail-safe manner in accordance with one or more aspects of the present invention.

Referring now to FIG. 9A, an exemplary method 900 is illustrated for monitoring, analyzing, and detecting sensor temperature and pressure, medium presence, and sensor failures, for example, in a fail-safe temperature, pressure and presence detection system similar to the systems of FIGS. 6, 7 and 8, in accordance with an aspect of the present invention. Method 900 may also be better understood in association with the thermal plot 1000a, and logic timing diagrams 1030 and 1050 of FIG. 10. While the method 900 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 900 according to the present invention may be implemented in association with the temperature, pressure and presence detection systems, elements, and devices illustrated and described herein as well as in association with other systems, elements, and devices not illustrated.

The exemplary fail-safe temperature and presence detection method 900 of FIG. 9A begins at 905. Initially (e.g., upon installation) at 910, method 900 comprises inputting and storing specific parameters 640 (e.g., the initial resistance $R_{m0}$ of the temperature sensor 420 from the sensor manufacturer, or as predetermined acceptable TC levels) of the fail-safe multi-sensor component 400/702 (e.g., RTD1, RTD2). Other parameters 640 input at 910 may also include the expected regulation temperature $T_{hf}$ of the heater 430, a TC $1^{st}$ level associated with the presence/absence of a medium, a TC $2^{nd}$ level associated with a sensor alarm level for maintenance, and a maximum allowable delay time $td_h$. The input parameters are stored in memory (e.g., 620) for future use and/or reference. At 915, a current from a power supply (e.g., 634) is applied to the heater 430 to begin heating the sensor 400/702.

After waiting for a period of time, such as the delay time $td_h$, at 920, the sensor will have heated to about the expected temperature $T_{hf}$ of the sensor 440/702. At 925, for example, after the delay time $td_h$, the temperature sensor 420 is then measured at an initial temperature $T_{mi}$. Accordingly, after an appropriate warm-up period, the measured initial temperature $T_{mi}$ indicated by the temperature sensor 420 of a healthy sensor will approximate the expected temperature $T_{hf}$, or $T_{mi} \sim T_{hf}$. Current from the power supply (e.g., 634) is then removed from the heater 430 at 930. As the sensor 400/702 cools down toward the temperature of the surrounding medium (e.g., water, Ammonia, Freon) at 935, the sensor temperature sensor 420 is monitored and measurements are taken. Optionally, the initial temperature $T_{mi}$ may be updated again or continuously updated just prior to the thermal cool-down slope measurements, to obtain a fully stabilized measurement $T_{mi}$ of the expected temperature $T_{hf}$.

When the temperature stabilizes, at 940, the temperature sensor 420 is measured at a final temperature $T_{mf}$, corresponding to the temperature of the surrounding medium (e.g., water, Freon). A thermal cool-down TC slope (slope 1) is then computed and stored at 945 based on the initial temperature $T_{mi}$, the final temperature $T_{mf}$, and elapsed time period $td_c$ between the temperature readings.

The computed TC slope level, slope 1 is then compared to the TC $1^{st}$ level associated with the presence/absence of a medium at 950. If it is determined at 950 that the measured TC level, slope 1 is greater than the TC $1^{st}$ level, indicating that the medium is present at the sensor (e.g., the sensor is immersed in water), then the medium is present at 955 and the algorithm and thermal cycling continues to 915, wherein the heater 430 is again heated for another temperature and presence detection. If, however, at 950 the measured TC level, slope 1 is not greater than the TC $1^{st}$ level, then it is determined that the medium is absent from the sensor, and a low-media alarm is output at 960 (e.g., the sensor is in air, alarm for low water cut-off), and the algorithm continues to 965.

At 965, the computed TC slope level, slope 1 is then compared to the TC $2^{nd}$ level associated with a sensor low level alarm for maintenance. If it is determined at 965 that the measured TC level, slope 1 is less than the TC $2^{nd}$ level, then an unacceptable sensor TC slope minimum level is indicated and the algorithm outputs a sensor alarm to maintenance at 970. If, however, the measured TC level, slope 1 is not less than the TC $2^{nd}$ level, then the sensor is checked further at 975. For example, if a crack or another defect forms in the sensor assembly 402 dielectric layers between the heater 430 and temperature sensor 420, or if the sensor otherwise fails, then the calculated slope may become lower than the acceptable minimum slope level.

At 975, a comparison is made to determine if the sensor (as indicated by the initial temperature measurement $T_{mi}$) was able to heat to within a predetermined percentage of the expected temperature $T_{hf}$ within the delay time $td_h$. This comparison indicates the ability of the heater 430 to heat properly to the expected temperature, as well as the ability of the temperature sensor 420 to accurately report the temperature of the heater 430. If the predetermined percentage of the expected temperature $T_{hf}$ is not achieved within the time delay limit $td_h$, then the algorithm outputs a sensor alarm to maintenance at 970. Otherwise, if the predetermined percentage of the expected temperature $T_{hf}$ is successfully achieved by the initial temperature measurement $T_{mi}$ within the time delay limit $td_h$, then the algorithm of method 900 may end at 980, and another heating and cooling thermal cycle of the method may begin again, for example, at 915, or method 900 may continue to the pressure detection portion of method 900 at 982 of FIG. 9C.

Alternately, at steps 935 and 940 of method 900, as the sensor cools down toward the temperature of the surrounding medium, the temperature sensor 420 is monitored and measurements are taken after the initial temperature $T_{mi}$ and before the final temperature $T_{mf}$, wherein such intermediate temperature measurements may be used to compute a thermal cool-down TC slope (slope 1) at 945.

Figure 9B:
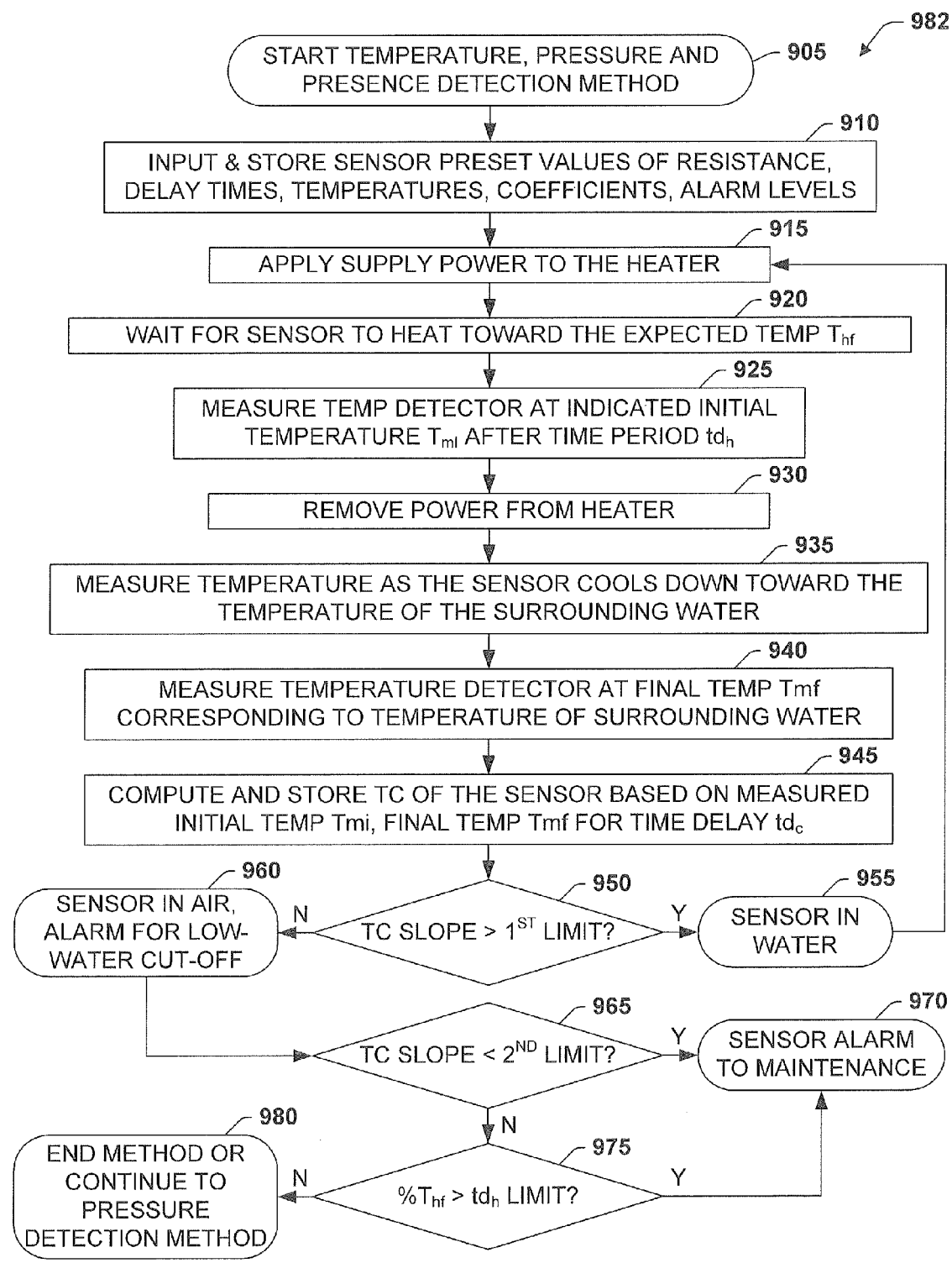

Similarly, the method 982 of FIG. 9B illustrates when water is used as the medium such as in a boiler similar to that of FIG. 5, wherein the TC levels are specifically predetermined to distinguish between a sensor immersed in water (media presence) and a sensor in air above the water (media absent).

In another aspect of the present invention of methods 900 and 982, a time-series history of the initial and final temperatures and/or the calculated thermal TC slopes may be recorded in the storage component 620 or 820 for later use. The recorded values may then be used in a trend analysis to anticipate future values based on an acceptable level of sensor or system degradation over time in order to make a failure prediction, or to signal that a failure is imminent.

Figure 9C:
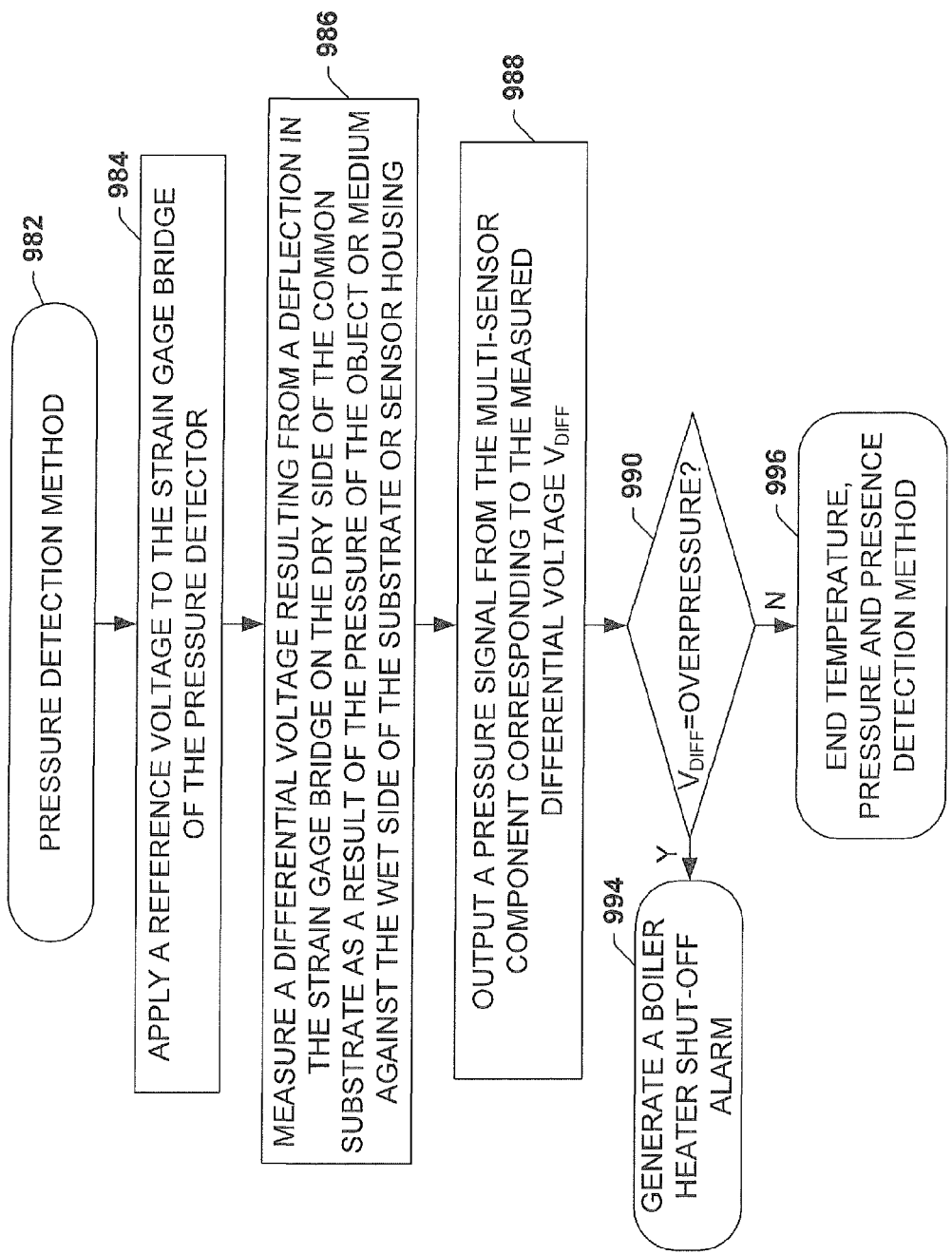

FIG. 9C illustrates the pressure detection portion of method 900 for monitoring, analyzing, and detecting the pressure of the medium and generating a boiler heater shut-off alarm, for example, in the fail-safe temperature, pressure and presence detection system similar to the systems of FIGS. 6, 7 and 8, in accordance with another aspect of the present invention.

Referencing the schematic diagram of FIG. 4J, the pressure detection portion of method 900 continues at 982, wherein at 984 of FIG. 9C, a reference voltage from controller/analyzer 407 is applied between terminals Vref and WCOM of the Wheatstone bridge W1 for the pressure detector 450.

At 984, when the medium (e.g., 510) or an object exerts a pressure on the wet side 412 of the substrate 410, the strain gauge elements 424 attached to the dry side 411 of the substrate 410 flex in response to the exerted medium pressure and produces associated resistance changes to the Wheatstone strain gauge bridge W1. In response to the resistance changes in the bridge W1 and the applied reference voltage Vref, the bridge W1 produces a corresponding differential voltage between terminals S+ and S−, which is detected and amplified by the controller/analyzer 407 and output at 988 as a pressure signal (e.g., 655 and/or on bus 409) from the multi-sensor component 400 corresponding to the differential voltage $V_{DIFF}$ from bridge W1 of the pressure detector 450.

At 990, the differential voltage $V_{DIFF}$ from bridge W1 of the pressure detector 450 is then also compared to an over-pressure level associated with a maximum safe operating pressure of the boiler 500. If it is determined at 990 that the measured differential voltage $V_{DIFF}$ is greater than the maximum safe operating pressure (an overpressure), then a boiler heater shut-off alarm is generated at 994 and the boiler heater may be shut-down to avoid boiler damage and to avoid the pressure relief valve from dumping water onto the floor of the boiler room. If however, at 990 the measured differential voltage $V_{DIFF}$ is not greater than the maximum safe operating pressure (an overpressure), then the temperature, pressure and presence detection method 900 ends at 996.

Figure 10:
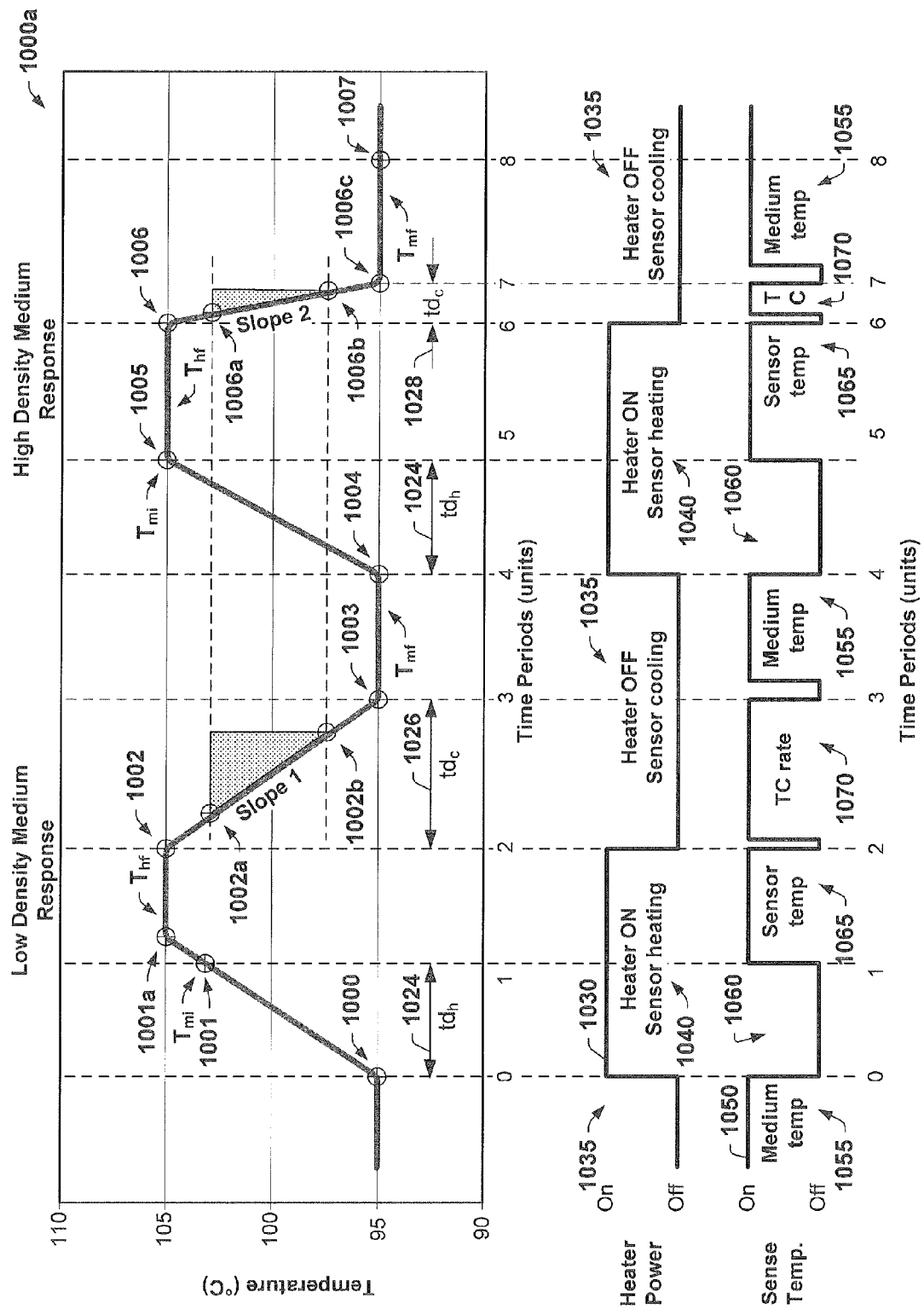
FIG. 10 is a simplified plot of the changes in temperature of the exemplary multi-sensor component monitoring systems of FIGS. 6, 7 and 8, a timing diagram plot of the heater on-times, and the temperature detection timing for measuring the medium temperature, the sensor regulation temperature, and the temperature decay rate time constant (TC) used to determine the absence or presence of a object or medium at the multi-sensor component as computed by the algorithms of FIGS. 9A, 9B and 9C in accordance with the present invention.

FIG. 10 illustrates a simplified plot 1000a of the changes in temperature of the exemplary fail-safe temperature/presence monitoring systems of FIGS. 6A, 6B, 7A, 7B, and 8. Plot 1000a of FIG. 10, also illustrates the heating and cooling cycles produced by the sensor heater 430 and the resulting temperature decay rates (slope 1 and slope 2) produced as a result of the absence or presence of a object or medium (e.g., water, 510) at the sensor (e.g., multi-sensor component 400/702) using the algorithms and methods 900 and 982 of FIGS. 9A and 9B, respectively in accordance with the present invention.

FIG. 10 further illustrates a timing diagram plot 1030 of the heater 430 on-times required to produce the sensor heating and cooling cycles of plot 1000a, and an associated plot 1050 of the temperature sensor 420 timing for measuring the various sensor temperatures. The sensor temperatures include a medium temperature, a sensor regulation temperature, and temperatures taken during a thermal cool-down, which may be used to compute the temperature response such as a temperature change, a rate of change and/or a thermal decay rate time constant (TC) or thermal TC slope of the multi-sensor component. The thermal TC slopes are then used to determine the absence or presence of an object or medium at the sensor 400/702 as computed by the algorithms and methods 900 and 982 of FIGS. 9A and 9B, respectively in accordance with the present invention.

Plot 1000a and timing diagrams 1030 and 1050 of FIG. 10 illustrate events which take place at exemplary time periods 0-8. For the present example of FIG. 10, the sensor 400/702 is at a temperature of about 95° C. (about 203° F.) just prior to time period 0 at temperature node 1000. Prior to time period 0, the sensor heater 430 of timing diagram 1030 is "off" (1035) with respect to the power supply voltage, and the sensor temperature sensor 420 of timing diagram 1050 is "on" and measuring the medium (e.g., water) temperature 1055. In accordance with method 900, heater 430 power 1030 is turned "on" 1040 at time period 0 at temperature node 1000 and the temperature detector may be turned "off" 1060 (or otherwise need not be used) while the sensor heats. After a predetermined time period $td_h$ 1024, after time period 1, the sensor should be fully heated to the expected regulated temperature $T_{hf}$ of the sensor 400/702 at temperature node 1001, which is about 105° C. (about 221° F.) in the present example.

For example, when heated to the expected regulated temperature $T_{hf}$, the temperature signal of the temperature sensor 420 may be compared with a known regulated temperature of the sensor 400/702 (or specifically the heater 430), using a measured heater current or power input to the heater 430 to confirm whether the temperature sensor 420 of the sensor is presenting an accurate temperature signal to the controller/analyzer 407.

The temperature sensor 420 may be verified 1065 at or after time period 1, by comparing the temperature sensor 420 measurement $T_{mi}$ 1065 to that of the expected regulation temperature $T_{hf}$ of the sensor 400/702. In addition, if a predetermined delay time ($td_h$ 1024) is exceeded (1001 to 1001a) during the sensor warm-up before $T_{mi}$ achieves a predetermined percentage of the expected regulation temperature $T_{hf}$, a sensor failure may be indicated. Alternately, a warm-up thermal TC slope may be computed to determine such a possible sensor failure. As power remains on the heater 430, after time period 1, the sensor 400/702 continues to heat but stays at the expected regulation temperature $T_{hf}$. At time period 2 the medium presence portion of the method 900 (steps 930 to 960) ensues, wherein a thermal cool-down slope is identified. At time period 2, the heater 430 is turned "off" 1035 and a last expected regulated temperature $T_{mi}$ measurement 1065 is recorded for future reference at temperature node 1002.

Between time periods 2 and 3, as the sensor 400/702 cools down toward the temperature of the surrounding medium, the temperature sensor 420 is again measured 1070 to determine the temperature response comprising one of a temperature change, a rate of change and a thermal decay rate time constant (TC) or slope (slope 1). At time period 3, a final temperature measurement $T_{mf}$ may be taken for calculation of the slope 1 (1070). The temperature difference between the expected regulation temperature $T_{mi}$ and the final temperature measurement $T_{mf}$ divided by the elapsed time ($td_c$, 1026) between these temperatures may be used for computation of slope 1. Alternately, two or more temperature measurements, such as 1002a and 1002b, and the elapsed time between the two measurements may be used for computation of slope 1. If the temperature response of slope 1 is low as illustrated between time periods 2 and 3, the medium may be indicated as absent from contact with the sensor. Between time periods 3 and 4, heater power remains "off" 1035 and the temperature of the surrounding medium may be measured 1055 using the temperature sensor 420. This completes one full thermal cycle of the sensor wherein the temperature and presence of the medium (e.g., water, 510) is detected.

For example, when a low water cut-off condition is encountered in a boiler, the medium (e.g., water) loses contact with the sensor and the computed slope is lower than a first expected TC limit. In such a case, water would likely be added to the boiler system, for example.

Another thermal cycle of the sensor is illustrated starting at time period 4, wherein heater power is again applied 1040 to heat the sensor to the expected regulation temperature $T_{mi}$ at time period 5, which is about 105° C. (about 221° F.) in the present example. The method continues between time periods 4-8 as described before between time periods 0-4, wherein a sensor verification temperature is taken between time periods 5 and 6, the allowable sensor warm-up time delay is verified ($td_h$ 1024), and another TC slope (slope 2) is determined over elapsed time ($td_c$, 1028) between two or more temperature measurements, such as 1006a and 1006b used for computation of slope 2 for indicating the presence of the medium. In this example, slope 2 illustrates a higher slope rate that may be an indication of the presence of the medium at the sensor. For example, if water is now present at the sensor of the boiler example, the TC slope level, slope 2 is higher than the first expected TC limit. If however, slope 2 is less than a second expected TC slope level, this may be an indication of another possible sensor or system failure condition.

Figure 11:
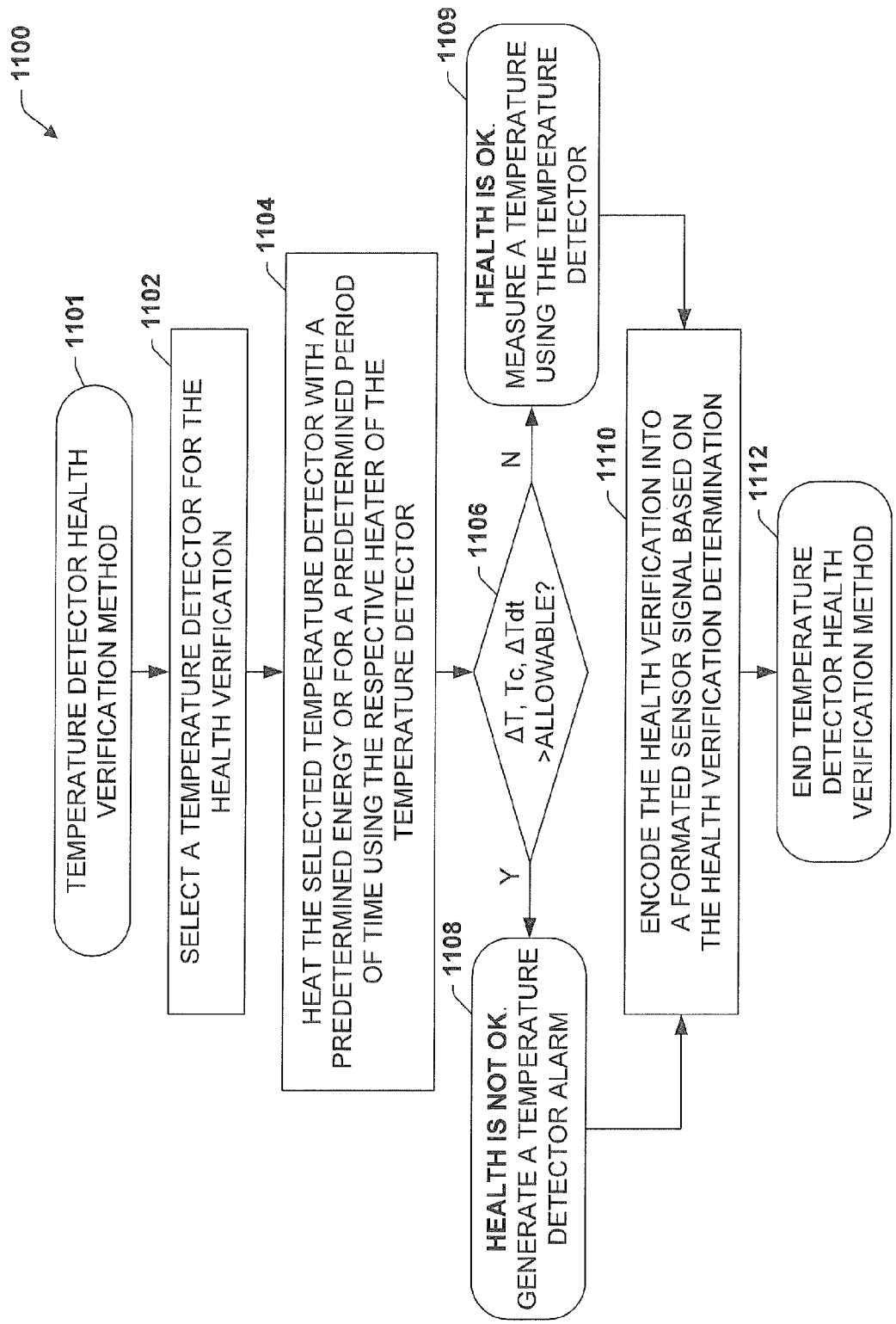
FIG. 11 is a flow chart diagram illustrating a method of verifying the health of one of a plurality of selected temperature detectors, generating a temperature detector alarm, and encoding the health verification into a formatted sensor signal generated from the multi-sensor component, such as that of FIGS. 4L and 4M, in accordance with one or more aspects of the present invention.

Referring now to FIG. 11, an exemplary method 1100 is illustrated for verification of the health of a temperature detector among a plurality of temperature detectors, for example, in a fail-safe multi-sensor component 480 similar to that of FIGS. 4L, 4M, 7B, 7C and 8, in accordance with an aspect of the present invention. While the method 1100 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 1100 according to the present invention may be implemented in association with the temperature, pressure and presence detection systems, elements, and devices illustrated and described herein as well as in association with other systems, elements, and devices not illustrated.

The exemplary temperature detector health verification method 1100 of FIG. 11 begins at 1101. Initially at 1102, and with reference to the multi-sensor component 480 of FIGS. 4L, 4M, 7B, 7C and 8, the method 1100 comprises periodically selecting one of the plurality of temperature detectors 490 for the health verification, wherein the selected temperature detector 490 comprises a temperature sensor 491 and a respective heater 492 affixed together on a substrate (e.g., PCB 493), the selected temperature sensor 491 and respective heater 492 having substantially close thermal union with one another (e.g., touching, as shown).

At 1104, the selected temperature detector 490 is heated by the respective heater 492 with a predetermined energy or for a predetermined period of time, to produce an expected thermal response in the multi-sensor component 480.

At 1106, a determination is made, for example, by the sensor monitor 496, if the selected temperature detector 490 has increased in temperature as measured by the temperature sensor 491 (e.g., using the corresponding detector measuring circuit 632). Sensor monitor 496 then determines if the temperature response falls short of or exceeds one of an allowable temperature change ($\Delta T$), a rate of change ($\Delta Tdt$), or a time constant (Tc) of a thermal rise rate of the selected temperature detector 490, wherein the determination thereof corresponds to a health verification of the selected temperature detector 490.

If it is determined at 1106 that the health of the selected temperature detector 490 is "not OK", then a temperature detector alarm is generated at 1108.

However, if it is determined at 1106 that the health of the selected temperature detector 490 is "OK", then temperature measurements are enabled to continue at 1109.

In either case, at 1110, the health verification may be encoded into a formatted sensor signal, based on the health verification determination, and the formatted sensor signal may be communicated over the I/O bus 487 to a controller/analyzer such as a Beckett AquaSmart™ controller/analyzer 801 of FIG. 8 or the control/display device 520 of FIG. 5.

Thereafter, at 1112, the temperature detector health verification method ends, wherein a subsequent detector health verification may performed in accordance with the present invention.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A multi-sensor component for an HVAC system operable to perform in a fail-safe manner, comprising:
    a sensor assembly, having one or more detectors, comprising:
        a plurality of temperature detectors operable to measure a temperature of an object or a medium;
        a presence detector operable to detect the presence of the object or medium in contact with the multi-sensor component; and
        a pressure detector operable to measure a pressure of the medium against the multi-sensor component;
    a sensor monitor operably coupled to the one or more detectors of the sensor assembly, the sensor monitor configured to use a detection algorithm operable to detect one or more of the temperature, pressure and presence of the object or medium in contact with the multi-sensor component, the sensor monitor configured to verify a health of the one or more detectors of the sensor assembly; and
    a sensor housing, thermo-well, or a combination thereof having the sensor assembly and the sensor monitor affixed therein,
    wherein the sensor monitor is configured to verify the health of the plurality of temperature detectors of the sensor assembly by:
        periodically selecting one of the plurality of temperature detectors for the health verification, the selected temperature detector comprising a temperature sensor and a respective heater affixed together on a substrate and having substantially close thermal union with one another,
        heating the selected temperature detector with a predetermined energy using the respective heater, or heat the selected temperature detector for a predetermined period of time using the respective heater,
        determining if the selected temperature detector has increased in temperature as measured by the temperature sensor to exceed one of an allowable temperature change, rate of change, and time constant of a thermal rise rate of the selected temperature detector, the determination thereof corresponding to a health verification of the selected temperature detector, and
        encoding the health verification into a formatted sensor signal, based on the health verification determination.

2. The multi-sensor component of claim 1, wherein the plurality of temperature detectors individually comprise
    a temperature sensor and a respective heater affixed together on a substrate and having substantially close thermal union with one another, wherein each heater comprises one or more resistive elements,
    wherein the plurality of temperature detectors reside on the same substrate affixed within the same sensor housing, thermo-well or combination thereof of the multi-sensor component.

3. The multi-sensor component of claim 2, wherein the presence detector comprises a heater operable to heat the multi-sensor component to an expected temperature as measured by the temperature detector or to heat the multi-sensor component with a predetermined energy, and wherein in a heating mode the multi-sensor component is either heated by the heater to the expected temperature or is heated with the predetermined energy, and wherein in a cooling mode the multi-sensor component cools toward a temperature associated with the object or medium, and the temperature detector provides temperature data indicative of a temperature response comprising one of a temperature change, a rate of change, and a time constant of a thermal decay rate of the multi-sensor component and the presence of the object or medium.

4. The multi-sensor component of claim 2, wherein
    the plurality of temperature detectors comprises two temperature detectors comprising two negative temperature coefficient (NTC) thermistors or resistance temperature detectors (RTDs) and two heaters individually comprising at least one resistive element; and
    the pressure detector comprises four vapor-deposited Platinum resistive elements interconnected in a full-wave strain gage bridge configuration;
    wherein the two temperature detectors provide redundancy for fail-safe operation of the temperature measurements.

5. The multi-sensor component of claim 2, wherein the substrate comprises one or a combination of a printed circuit board material, a ceramic, a composite, a fiber reinforced composite material, and an insulative material.

6. The multi-sensor component of claim 1, further comprising
    generating a temperature detector alarm if the health verification determination is that the selected temperature detector health is not OK, and
    measuring a temperature of the object or medium using the temperature detector if the health verification determination is that the health of the selected temperature detector is OK.

7. The multi-sensor component of claim 1, wherein
    the plurality of temperature detectors individually comprise at least one negative temperature coefficient (NTC) thermistor or resistance temperature detector (RTD);
    the presence detector comprises a heater comprising at least one resistive element; and
    the pressure detector comprises a full-wave strain gage bridge.

8. The multi-sensor component of claim 1, further comprising a controller connected to electrical terminals of the multi-sensor component.

9. The multi-sensor component of claim 1, wherein the multi-sensor component is affixed at a location in the HVAC system to provide thermal contact with one of the object and the medium on a wet side of the sensor housing, wherein the location is representative of a fail-safe operation level of the object or medium.

10. The multi-sensor component of claim 1, further comprising a detection algorithm that interprets the temperature data wherein the presence of the object or medium at the multi-sensor component may be determined in a fail-safe manner by calculating a temperature response comprising one of a temperature change, a rate of change, and a time constant of the thermal decay rate of the multi-sensor component upon cooling.

11. A multi-sensor component for an HVAC system operable to perform in a fail-safe manner, comprising:
- a sensor assembly, having one or more detectors, comprising:
  - a plurality of temperature detectors operable to measure a temperature of an object or a medium;
  - a presence detector operable to detect the presence of the object or medium in contact with the multi-sensor component; and
  - a pressure detector operable to measure a pressure of the medium against the multi-sensor component;
- a sensor monitor operably coupled to the one or more detectors of the sensor assembly, the sensor monitor configured to use a detection algorithm operable to detect one or more of the temperature, pressure and presence of the object or medium in contact with the multi-sensor component, the sensor monitor configured to verify a health of the one or more detectors of the sensor assembly;
- a sensor housing, thermo-well, or a combination thereof having the sensor assembly and the sensor monitor affixed therein;
- a signal processor operably coupled to the one or more detectors of the multi-sensor component, the signal processor configured to amplify and format temperature, presence and pressure signals generated by the respective one or more detectors, and to encode health data regarding the health of the one or more detectors into a formatted sensor signal; and
- a clamping circuit configured to receive the formatted sensor signal from the signal processor, and configured to shunt any noise, over-voltages or under-voltages on the formatted sensor signal to a supply voltage or a ground voltage associated with a power supply.

12. The multi-sensor component of claim 11,
- wherein two temperature signals generated by the plurality of temperature detectors are averaged together by the detection algorithm into an average temperature signal before being formatted into the formatted sensor signal, in order to provide temperature measurement redundancy;
- wherein object or medium presence signals generated by the presence detector are provided to the sensor monitor and utilized by the detection algorithm to generate a presence determination, the level of which provides one or a combination of an indication of a low medium alarm, a medium presence signal and a sensor alarm;
- and wherein pressure signals generated by pressure detector are provided to the sensor monitor and utilized by the detection algorithm to generate a sensor pressure computation, the level of which provides one or a combination of an indication of a pressure detection, an over-pressure alarm, and a sensor alarm.

13. The multi-sensor component of claim 11, wherein the plurality of temperature detectors, the sensor monitor and the clamping circuit are pre-fabricated together on a single substrate affixed within the sensor housing or thermo-well or combination thereof.

14. The multi-sensor component of claim 11, wherein the sensor monitor is operable to receive one or more sensor parametric inputs provided by the manufacturer.

15. The multi-sensor component of claim 11, wherein the multi-sensor component is operable to digitally communicate the formatted sensor signal comprising one or more of a temperature signal, a pressure signal, a object or medium presence signal, a sensor parametric input, a sensor model, a sensor serial number, a manufacturing date, a calibration temperature and a calibration pressure.

16. The multi-sensor component of claim 11, wherein the formatted sensor signal is formatted for digital communication between the sensor monitor and an HVAC controller.

* * * * *